United States Patent
Roy et al.

(10) Patent No.: US 12,302,387 B2
(45) Date of Patent: May 13, 2025

(54) METHODS, ARCHITECTURES, APPARATUSES AND SYSTEMS DIRECTED TO WIRELESS TRANSMIT/RECEIVE UNIT (WTRU) INITIATED ACTIVE SENSING

(71) Applicant: InterDigital Patent Holdings, Inc., Wilmington, DE (US)

(72) Inventors: Arnab Roy, Phoenixville, PA (US); Sanjay Goyal, Deer Park, NY (US); Kevin T Wanuga, Souderton, PA (US); Janet Stern-Berkowitz, Little Neck, NY (US); Onur Sahin, London (GB); Alpaslan Demir, East Meadow, NY (US); Mihaela Beluri, Jericho, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 379 days.

(21) Appl. No.: 17/802,679

(22) PCT Filed: Mar. 6, 2021

(86) PCT No.: PCT/US2021/021271
§ 371 (c)(1),
(2) Date: Aug. 26, 2022

(87) PCT Pub. No.: WO2021/178941
PCT Pub. Date: Sep. 10, 2021

(65) Prior Publication Data
US 2023/0086144 A1    Mar. 23, 2023

Related U.S. Application Data

(60) Provisional application No. 62/986,625, filed on Mar. 6, 2020.

(51) Int. Cl.
H04W 72/20 (2023.01)
H04L 5/00 (2006.01)
H04W 74/0808 (2024.01)

(52) U.S. Cl.
CPC ............................. *H04W 74/0808* (2013.01)

(58) Field of Classification Search
None
See application file for complete search history.

(56) References Cited

U.S. PATENT DOCUMENTS

2012/0032855 A1*  2/2012  Reede ................... G01S 13/82
                                                    370/252
2012/0094651 A1*  4/2012  Chun ................ H04W 36/0027
                                                    455/422.1
(Continued)

FOREIGN PATENT DOCUMENTS

WO    WO 2019190914 A1   10/2019

OTHER PUBLICATIONS

Rahman et al: "Framework for a Perceptive Mobile Network Using Joint Communication and Radar Sensing," IEEE Transactions on Aerospace and Electronic Systems, IEEE Service Center, Piscataway, NJ, vol. 56, No. 3, Sep. 9, 2019, 16 pages.
(Continued)

*Primary Examiner* — Ajit Patel
(74) *Attorney, Agent, or Firm* — Majid Albassam

(57) ABSTRACT

Methods, architectures, apparatuses and systems directed to active sensing in a wireless communications system (WCS) are provided. A method may include receiving, from a network element, information indicating an activation of a
(Continued)

first of a plurality of sensing configurations, wherein the first sensing configuration and a second of a plurality of sensing configurations may include information indicating first and second resources of the WCS; transmitting a first sensing signal according to the first sensing configuration and using the first resources; performing first measurements related to the first sensing signal; transmitting, to the network element, information indicating a change from the first sensing configuration to the second configuration; receiving, from the network element, information indicating an acknowledgment of the change in the sensing configurations; transmitting a second sensing signal according to the second sensing configuration and using the second resources; and performing second measurements related to the second sensing signal.

20 Claims, 15 Drawing Sheets

(56) References Cited

U.S. PATENT DOCUMENTS

| | | | |
|---|---|---|---|
| 2014/0148196 A1* | 5/2014 | Bassan-Eskenazi | H04W 4/029 455/456.1 |
| 2017/0273036 A1* | 9/2017 | Pietraski | H04W 52/346 |
| 2018/0069681 A1 | 3/2018 | Chakraborty et al. | |

OTHER PUBLICATIONS

Hisu et al., "Enabling Identification and Behavioral Sensing in Homes using Radio Reflections," CHI 2019, Glasgow, Scotland, UK, May 4-9, 2019, 15 pages.

Zhang et al., "WiDetect: Robust Motion Detection with a Statistical Electromagnetic Model," Proceedings of the ACM on Interactive, Mobile, Wearable and Ubiquitous Technologies (IMWUT), vol. 3, No. 3, Article 122, Sep. 2019, 24 pages.

* cited by examiner

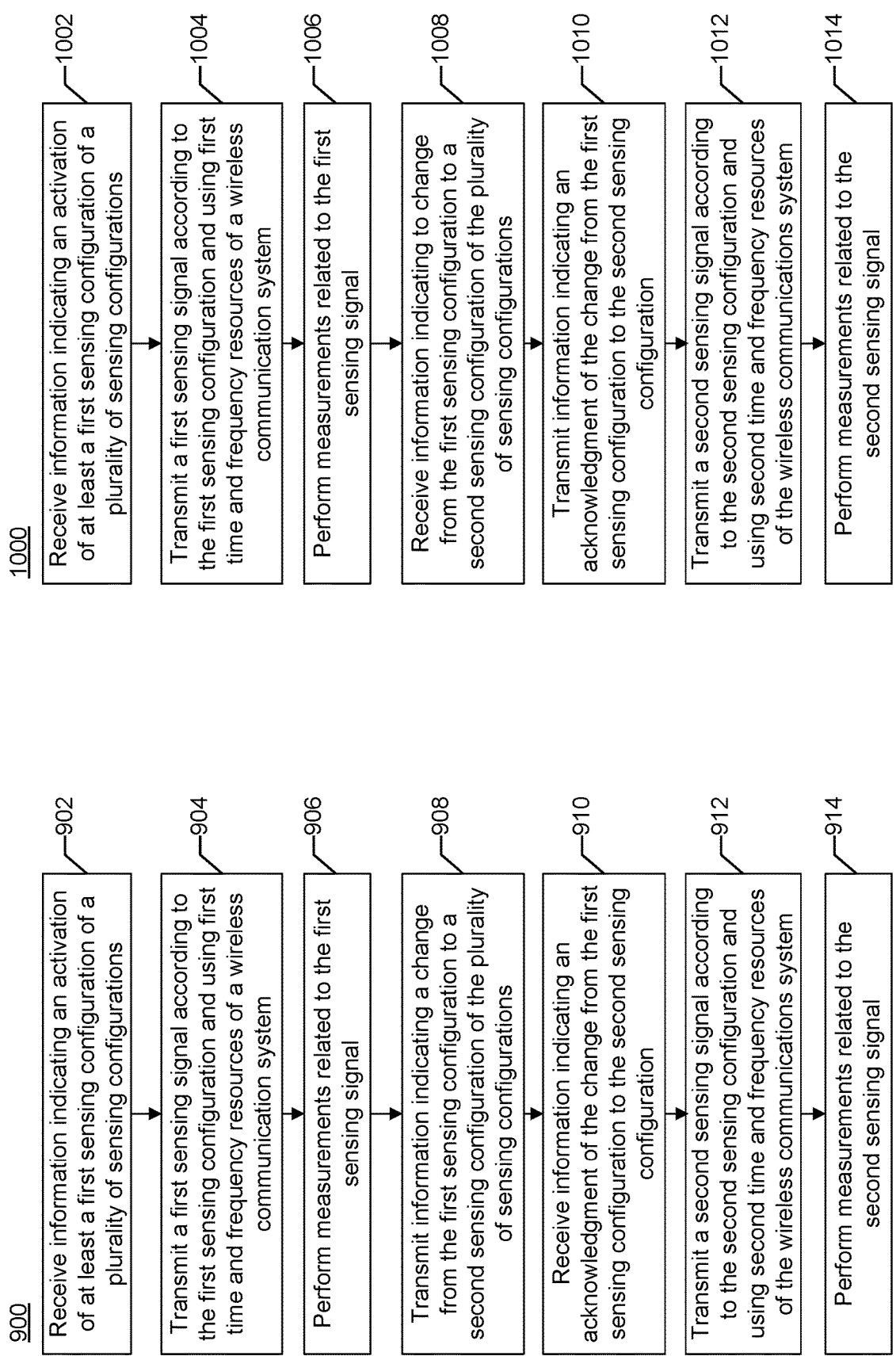

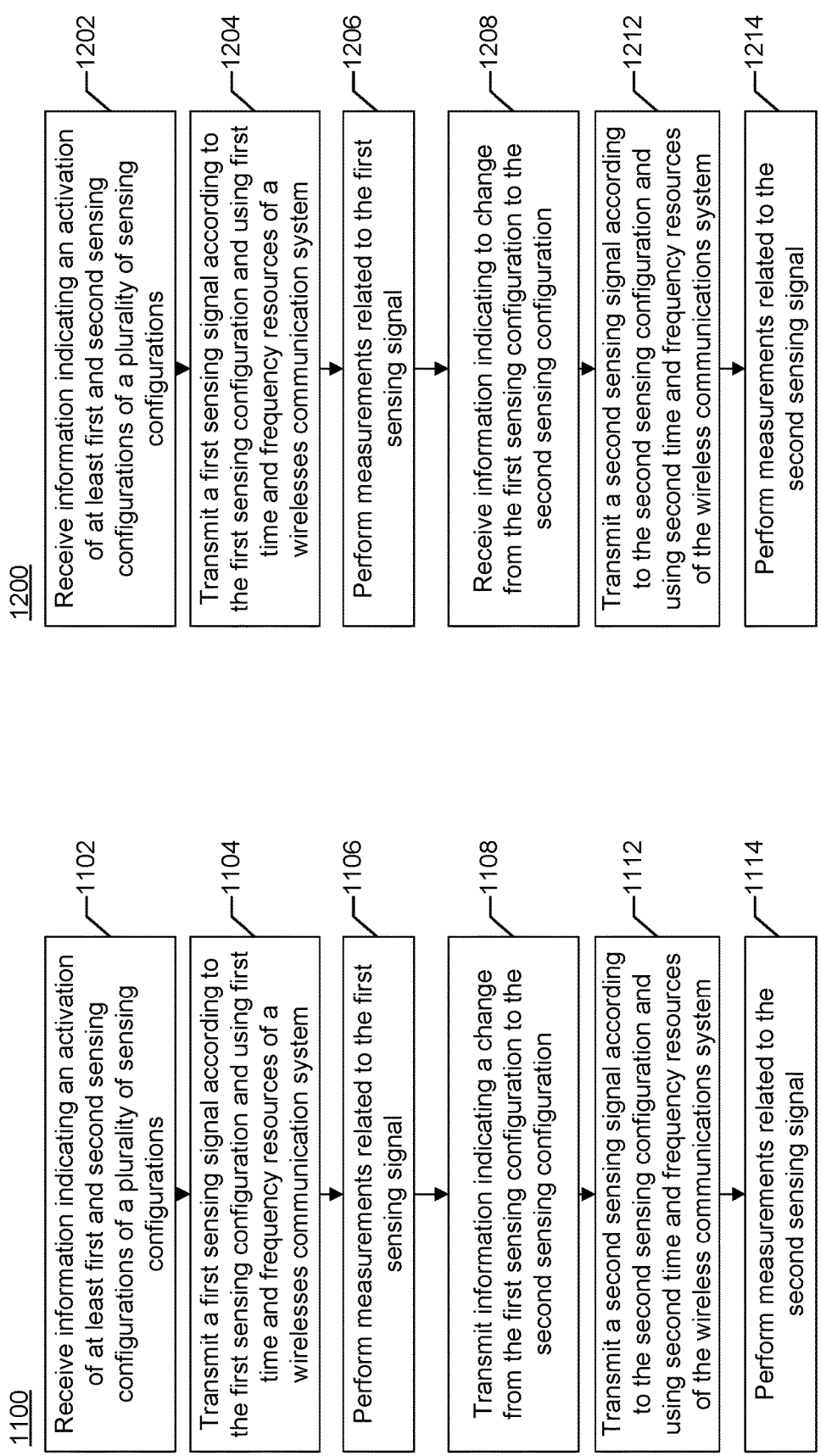

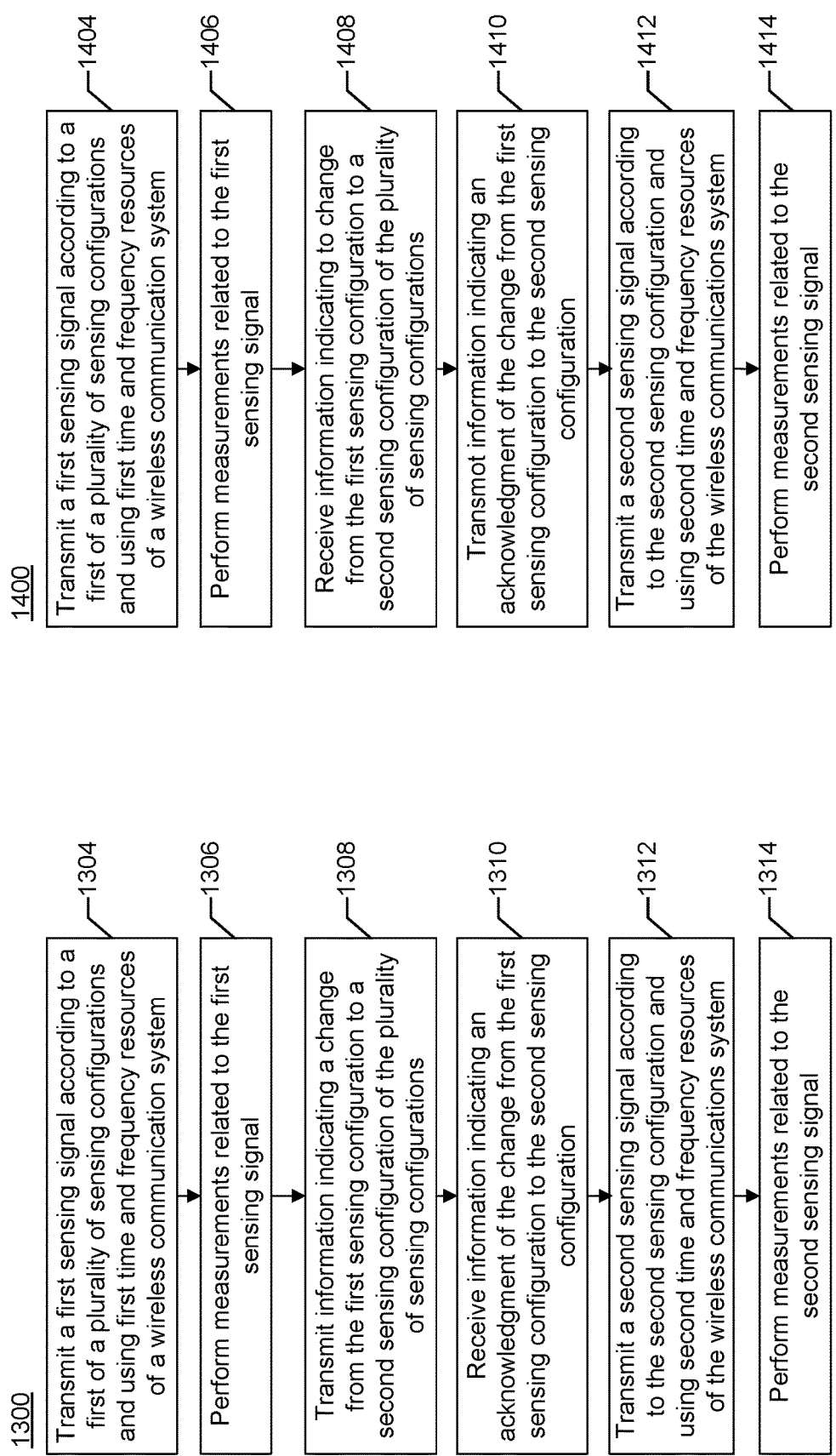

METHODS, ARCHITECTURES, APPARATUSES AND SYSTEMS DIRECTED TO WIRELESS TRANSMIT/RECEIVE UNIT (WTRU) INITIATED ACTIVE SENSING

CROSS REFERENCE TO RELATED APPLICATIONS

This application is a U.S. National Stage Application under 35 U.S.C. § 371 of International Patent Application No. PCT/US2021/021271, filed Mar. 6, 2021, which claims the benefit of priority to U.S. Provisional Patent Application No. 62/986,625 filed Mar. 6, 2020, which is incorporated herein by reference.

BACKGROUND

Embodiments disclosed herein generally relate to wireless and/or wired communications and, for example to methods, architectures, apparatuses and systems directed to wireless transmit/receive unit (WTRU) initiated active sensing.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein:

FIG. 1E is a block diagram illustrating various example elements of the example communications system;

FIG. 1F is a block diagram illustrating an example architecture of the example communications system;

FIGS. 9-14 are flow charts illustrating example flows for carrying out WTRU-initiated active sensing using resources of a wireless communications system according to various embodiments;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. Wired networks are well-known. An overview of various types of wireless devices and infrastructure is provided with respect to FIGS. 1A-ID, where various elements of the network may utilize, perform, be arranged in accordance with and/or be adapted and/or configured for the methods, apparatuses and systems provided herein.

Figure 1A:
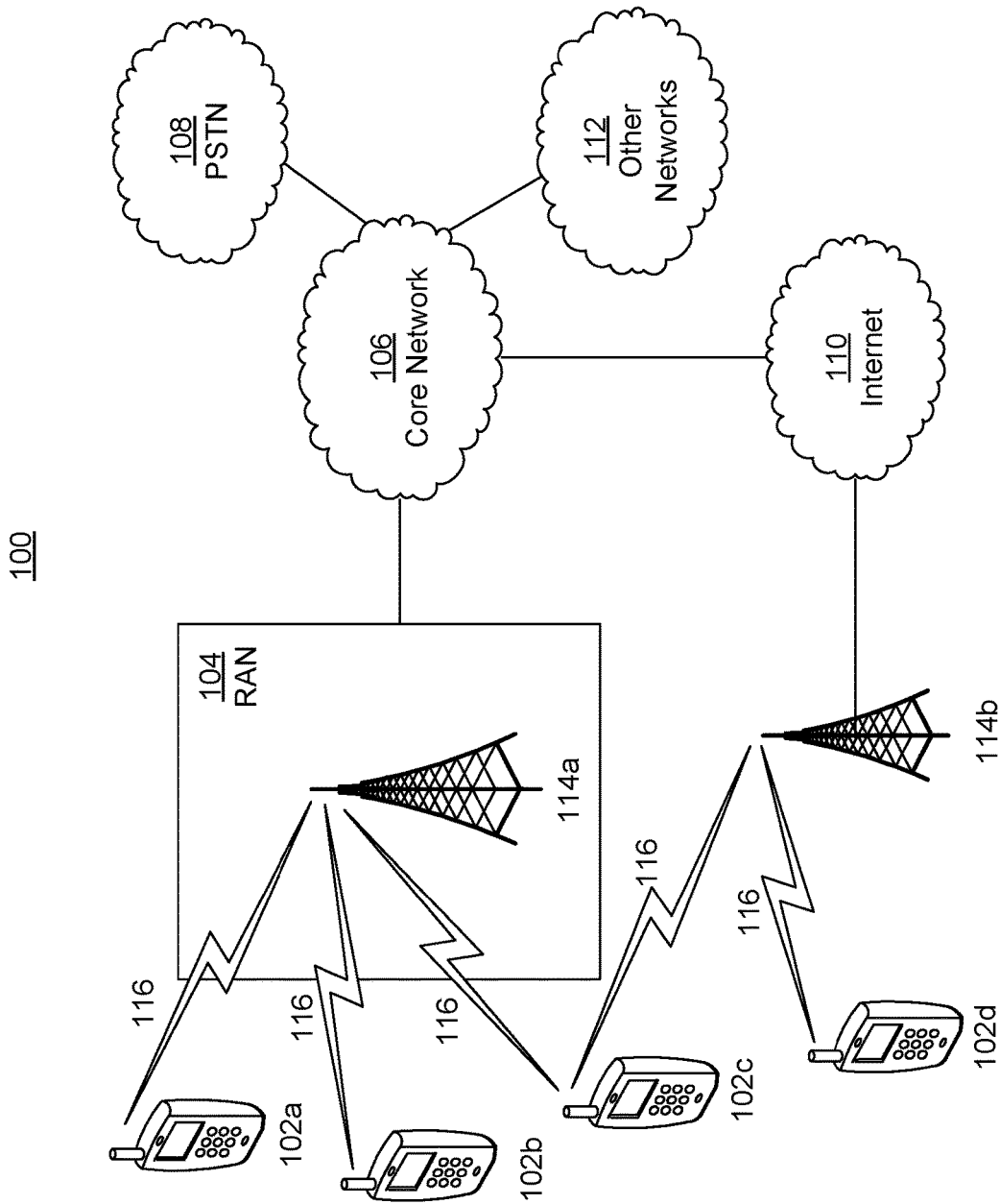
FIG. 1A is a system diagram illustrating an example communications system.

FIG. 1A is a diagram of an example communications system 100 in which one or more disclosed embodiments may be implemented. Example communications system 100 is provided for the purpose of illustration only and is not limiting of the disclosed embodiments. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a. 102b. 102c. 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a. 102b. 102c. 102d may be any type of device configured to operate and/or communicate in a wireless environment. By way of example, the WTRUs 102a. 102b. 102c. 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronic device, a device operating on commercial and/or industrial wireless networks, and the like. Any of the WTRUs 102a. 102b. 102c and 102d may be interchangeably referred to as a WTRU.

The communications systems 100 may also include a base station 114a and/or a base station 114b. Each of the base stations 114a. 114b may be any type of device configured to wirelessly interface with at least one of the WTRUs 102a. 102b. 102c. 102d. e.g., to facilitate access to one or more communication networks, such as the CN 106/115, the Internet 110, and/or the networks 112. By way of example, the base stations 114a. 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c. 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a. 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a. 102b, 102c may implement multiple radio access technologies. For example, the base station 114a and the WTRUs 102a. 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a. 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102*a*. 102*b*. 102*c*. 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling. Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM. UMTS. CDMA 2000, WiMAX. E-UTRA, or Wi-Fi radio technology.

The CN 106/115 may also serve as a gateway for the WTRUs 102*a*. 102*b*. 102*c*. 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another CN connected to one or more RANs, which may employ the same RAT as the RAN 104/114 or a different RAT.

Some or all of the WTRUs 102*a*. 102*b*. 102*c*. 102*d* in the communications system 100 may include multi-mode capabilities (e.g., the WTRUs 102*a*. 102*b*. 102*c*. 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
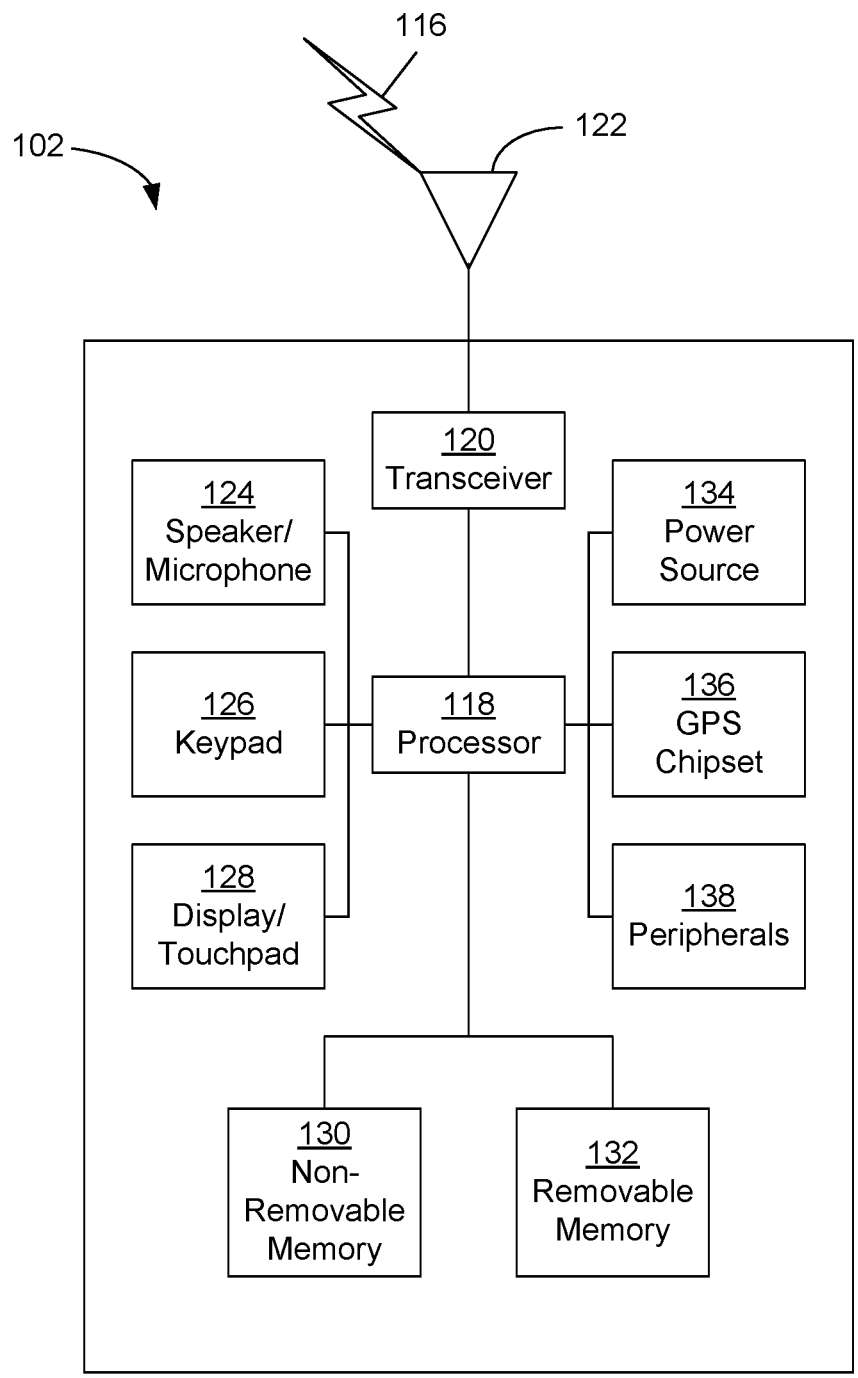
FIG. 1B is a system diagram illustrating an example wireless transmit/receive unit (WTRU) that may be used within the communications system illustrated in FIG. 1A.

FIG. 1B is a system diagram of an example WTRU 102. Example WTRU 102 is provided for the purpose of illustration only and is not limiting of the disclosed embodiments. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. For example, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules/units that provide additional features, functionality and/or wired or wireless connectivity. For example, the peripherals 138 may include an accelerometer, an e-compass, a satellite transceiver, a digital camera (e.g., for photographs or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
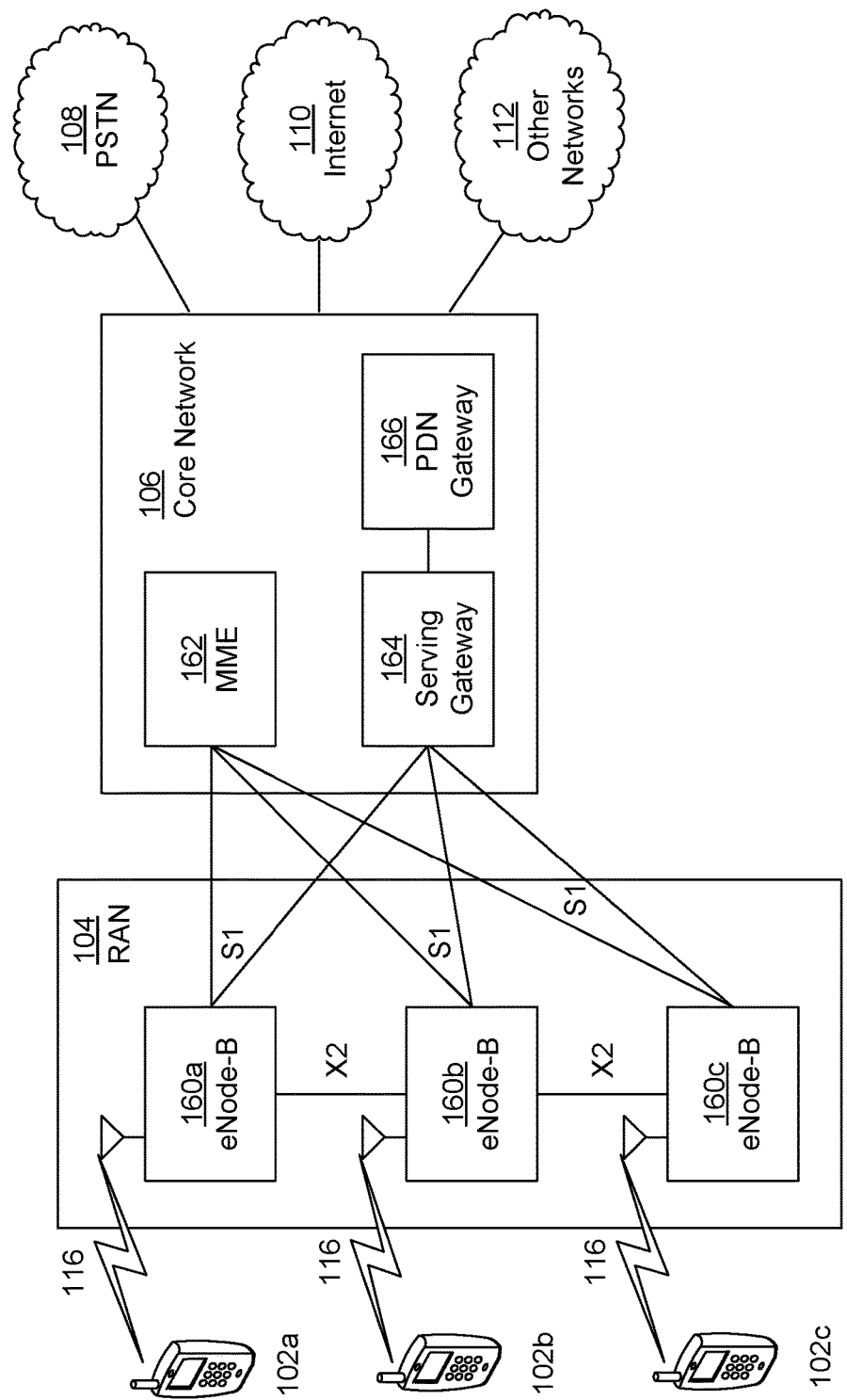
FIG. 1C is a system diagram illustrating an example radio access network (RAN) and an example core network (CN) that may be used within the communications system illustrated in FIG. 1A.

FIG. 1C is a system diagram of the RAN 104 and the CN 106 according to another embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The core network 106 shown in FIG. 1C may include a mobility management gateway (MME) 162, a serving gateway (SGW) 164, and a packet data network (PDN) gateway 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an SI interface and may serve as a control node. For example, the MME 162 may be responsible for authenticating users of the WTRUs 102a, 102b, 102c, bearer activation/deactivation, selecting a particular serving gateway during an initial attach of the WTRUs 102a. 102b. 102c, and the like. The MME 162 may also provide a control plane function for switching between the RAN 104 and other RANs (not shown) that employ other radio technologies, such as GSM or WCDMA.

The SGW 164 may be connected to each of the eNode-Bs 160a. 160b. 160c in the RAN 104 via the SI interface. The SGW 164 may generally route and forward user data packets to/from the WTRUs 102a. 102b. 102c. The SGW 164 may also perform other functions, such as anchoring user planes during inter-eNode-B handovers, triggering paging when DL data is available for the WTRUs 102a. 102b. 102c, managing and storing contexts of the WTRUs 102a. 102b. 102c, and the like.

The SGW 164 may also be connected to the PDN gateway 166, which may provide the WTRUs 102a. 102b. 102c with access to packet-switched networks, such as the Internet 110, to facilitate communications between the WTRUs 102a. 102b. 102c and IP-enabled devices.

The CN 106 may facilitate communications with other networks. For example, the CN 106 may provide the WTRUs 102a. 102b. 102c with access to circuit-switched networks, such as the PSTN 108, to facilitate communications between the WTRUs 102a. 102b. 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a. 102b. 102c with access to the other networks 112, which may include other wired or wireless networks that are owned and/or operated by other service providers.

Although the WTRU is described in FIGS. 1A-ID as a wireless terminal, it is contemplated that in certain representative embodiments that such a terminal may use (e.g., temporarily or permanently) wired communication interfaces with the communication network. In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHZ. 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHZ channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHZ channels, and the data may be transmitted by a transmitting STA. At the receiver of the receiving STA, the above described operation for the 80+80 configuration may be reversed, and the combined data may be sent to a Medium Access Control (MAC).

Sub 1 GHZ modes of operation are supported by 802.11af and 802.11ah. The channel operating bandwidths, and carriers, are reduced in 802.11af and 802.11ah relative to those used in 802.11n, and 802.11ac. 802.11af supports 5 MHZ. 10 MHZ and 20 MHz bandwidths in the TV White Space (TVWS) spectrum, and 802.11ah supports 1 MHZ. 2 MHZ, 4 MHZ. 8 MHZ, and 16 MHz bandwidths using non-TVWS spectrum. According to a representative embodiment. 802.11 ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n. 802.11ac. 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHZ mode, even if the AP, and other STAs in the BSS support 2 MHZ. 4 MHZ. 8 MHZ. 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHZ. In Korea, the available frequency bands are from 917.5 MHz to 923.5 MHz. In Japan, the available frequency bands are from 916.5 MHZ to 927.5 MHZ. The total bandwidth available for 802.11ah is 6 MHz to 26 MHz depending on the country code.

Figure 1D:
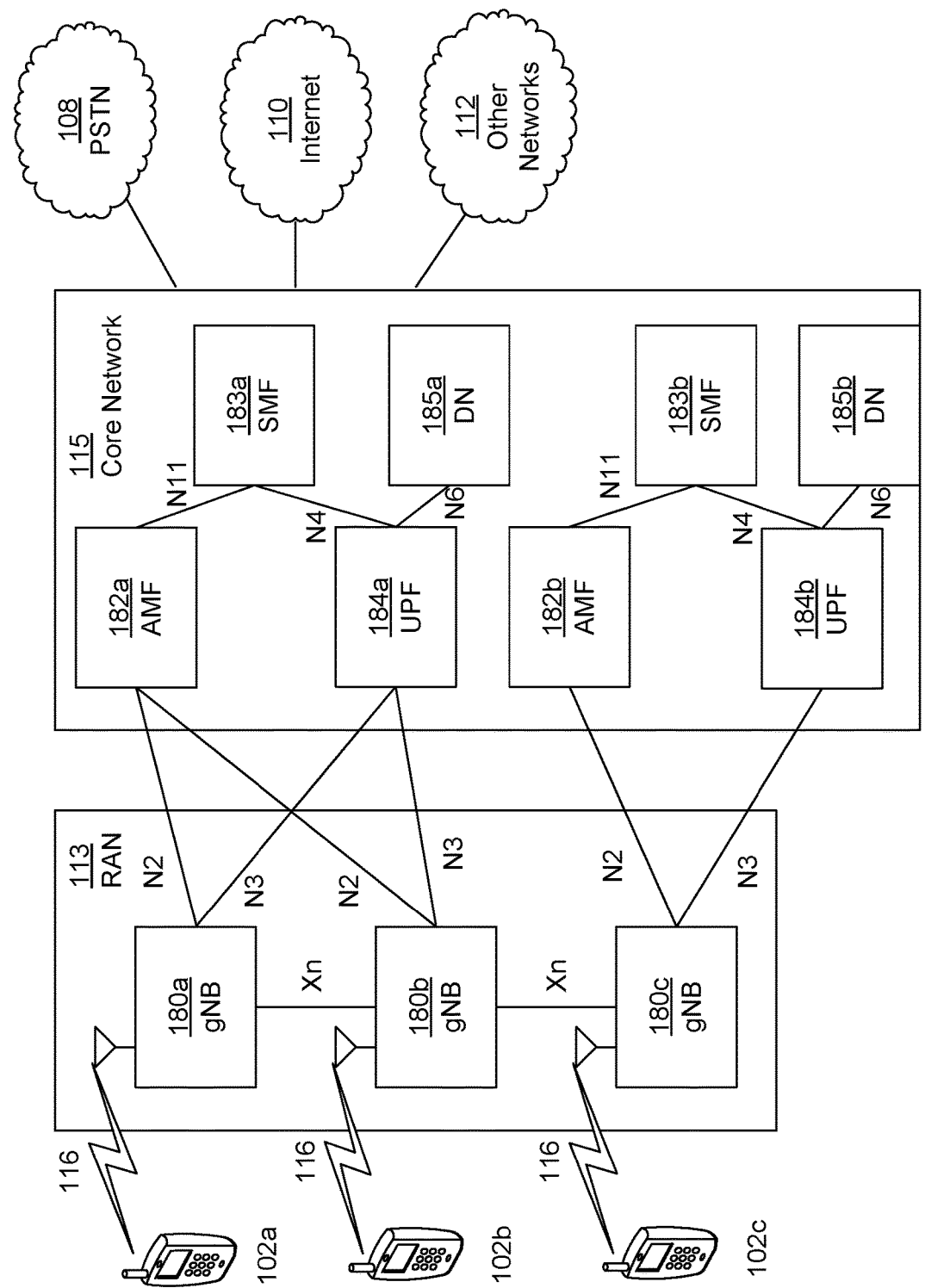
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a. 102b. 102c over the air interface 116. The RAN 113 may also be in communication with the CN 115.

The RAN 113 may include gNBs 180a. 180b. 180c, though it will be appreciated that the RAN 113 may include any number of gNBs while remaining consistent with an embodiment. The gNBs 180a. 180b. 180c may each include one or more transceivers for communicating with the WTRUs 102a. 102b. 102c over the air interface 116. In one embodiment, the gNBs 180a. 180b. 180c may implement MIMO technology. For example, gNBs 180a. 180b may utilize beamforming to transmit signals to and/or receive signals from the gNBs 180a. 180b. 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a. 180b, 180c may be configured to communicate with the WTRUs 102a. 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a. 180b, 180c using signals in an unlicensed band. In a non-standalone configuration WTRUs 102a, 102b, 102c may communicate with/connect to gNBs 180a. 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different packet data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a. 184b and the DN 185a, 185b.

In view of FIGS. 1A-1D, and the corresponding description of FIGS. 1A-ID, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

INTRODUCTION

The continuous need for higher user data rates, increased cell capacity, reduced latency, support for IoT and others led to the recently introduced and continued development of fifth generation (5G) wireless technologies. In addition to traditional sub-6 GHz frequency bands used by fourth generation (4G) and prior wireless technologies, 5G wireless systems use higher frequency bands (e.g., above 6 GHZ and in the millimeter wave ("mmWave") spectrum), where large swaths of spectrum are available.

Due to the large available bandwidths, these bands are useful for delivering very high data rates (addressing the Enhanced Mobile Broadband eMBB use case) and for enhanced positioning applications. While providing clear advantages in terms of available bandwidth, attainable data rates, increased accuracy for positioning, propagation in the higher frequency bands (e.g., mmWave) suffers from severe attenuation and blockage. To mitigate the path loss, highly directive systems (highly directive beamforming) are needed. While beamforming was already used in 4G systems, the need for additional Tx/Rx gains to compensate the high path loss in the higher frequency bands (e.g., mmWave) requires even more directive systems. For example, the current release 15 and release 16 new radio (NR) specifications promulgated by the Third Generation Partnership Project (3GPP) provide support for up to 64 beams for frequency ranges up to 52.6 GHZ. However, it is expected that for frequencies above 52.6 GHZ, the number of beams may further increase, and the corresponding beam widths may also decrease (leading for example to the use of "pencil" beams).

To maintain the link for directive systems supporting a high number of beams/narrow beams, and to mitigate the impairments specific to mmWave bands (e.g. blockage and/or misalignment of beams), beam management procedures are needed. While release 15 and 16 of the 3GPP NR specifications define beam management procedures for frequency bands below 52.6 GHz, there is a large overhead associated with beam management. The overhead is likely to increase, as the number of beams increases and the beam width decreases for higher frequency bands.

The availability of large amounts of spectrum (large channel bandwidths) also enables other applications, such as enhanced positioning (as the large channel bandwidth leads to increased resolution in ranging/positioning). Enhanced positioning information furthermore enables high resolution detection of objects in an environment, therefore resulting in a more clear physical estimation of the operating environment using radio waves, also known as radio environment mapping. For wireless networks, this could imply detection of static and/or mobile obstacles and multi-path characteristics, which are critical for configuration and optimization of these systems.

Since ranging (e.g. radar), enhanced positioning, and high data rates communications applications all benefit from the use of wide channel bandwidths, it may be beneficial to consider technologies that provide communications and sensing functionality using the same spectrum/frequency bands and the same hardware (transmitter, receiver, etc.). Joint communications and sensing (JCS) technologies may help reduce the complexity and cost, by using a common framework for seamless and coordinated operation of communication layer and in-band radar.

The two most basic function of radar are inherent in the word radar, which is itself an acronym for the phrase radio detection and ranging. Additionally, the ability to determine bearing, or angular position of a target with respect to the transmitter has been made available through directional transmission of radar signals. Finally, the estimation of a targets velocity from the target's Doppler frequency has become a fundamental function of radar systems as well.

Detection, as a fundamental function of radar, refers to a system's ability to discriminate a target from the background noise and radar clutter of the environment in which the target resides. Key performance indicators of a radar system's detection capability include detection range, and resolution, or the radar system's ability to distinguish between multiple targets on the same bearing and/or range to the radar system.

Detection range, in general, may be improved through increasing transmit power and/or receiver sensitivity of the radar system, but may be affected by an operating frequency of the radar system, which may result in both different path loss of the radar signal and a different radar cross section (RCS) of the target being detected. RCS refers to the measure of a target's ability to reflect radar signals in the direction of the radar receiver. The RCS is a function of material composition, bearing, orientation and geometry of the target, as well as the frequency of the radar signal being used for detection. Range resolution is typically a function of a duration of a radar pulse, in non-coherent systems, or a radar pulses bandwidth, in coherent detection.

A ranging capability of a radar system refers to the radar system's ability to estimate the distance of the target to the radar receiver. Ranging accuracy is typically characterized as a ranging resolution. The ranging resolution refers to both a margin of uncertainty for a radar system's range estimate, and a minimum distance between two targets such that the radar system can detect both objects. In non-coherent radar detection, the radar system's range resolution decreases linearly with the radar transmission's pulse width, while with a coherent radar detection, the range resolution can be improved linearly with system bandwidth.

A target's bearing, or angular position relative to the radar receiver, can be obtained from directional transmission of radar signals by isolating reflections from a limited direction of arrival. In analog beamforming, the limit of angular resolution is determined by the beam width of the radar transmission. Angular resolution can be improved with smart array radar systems, where the limiting factor becomes estimation error from system noise.

Estimating a target's velocity is a capability of radar enabled by the Doppler shift of signals reflected off of the target while it is in motion. A shift in the frequency of a reflected signal relative to the transmitted signal indicates target mobility proportional to the magnitude of the frequency shift. Estimating target velocity can be made challenging by the presence of multiple targets and/or multi-path reflections which can require sophisticated algorithms to isolate target sources, and lead to estimate instability. Additionally, estimating the velocity of an accelerating target can complicate velocity estimation.

Radar architectures/systems can be classified as continuous wave radar or pulse modulation radar. Continuous wave radar refers to radar architectures/systems in which a radar signal is transmitted and received continuously. Pulse modulation radar refers to radar architectures/systems in which transmission and reception of a radar signal are duplexed in time. Like communication system waveforms, radar waveforms may use any of phase, frequency and amplitude modulation to aid in the detection of targets.

Pulsed radar emits short pulses and echo signals are received in silent period therebetween. This method is characterized by very short transmission pulses followed by very large pauses, which are referred as receiving times. Pulsed radar systems are more naturally capable of estimating target range and bearing, particularly in the presence of multiple targets, but suffer from a minimum detection range determined by the time the signal must propagate before the radar can transmit the radar pulse and switch to receive mode to detect the reflection.

Continuous wave (CW) radar systems emit electromagnetic radiations at all times. A CW radar transmitting unmodulated signal can measure only the speed of a reflecting target using the Doppler effect. Unmodulated CW radar systems cannot measure range and cannot differentiate between two or more targets. In frequency modulated CW (FMCW) radar systems, the range can be determined by measuring the frequency of the returning signal and determining a time delay between the transmission and reception of the returning signal.

The main advantage of CW radar is that energy is not pulsed, so these are much simpler to manufacture and operate. They have no minimum or maximum range, although the transmit power imposes a practical limit on range. CW radar maximize total power on a target because the transmitter is broadcasting continuously. On the other hand, a pulsed radar system typically provides greater measurement range compared to a CW radar system, such as an FMCW radar system, with lower power consumption.

CW radar systems do not suffer from a minimum ranging distance, and offer a more natural framework for estimating a target's velocity, but can perform sub-optimally in multi-target scenarios, or with rich multipath.

For the purposes of designing radar waveforms that can coexist optimally with modern wireless and mobile communication systems, a natural selection of waveform would be pulsed phase and amplitude modulated waveforms. These types of waveforms are most similar to those of wireless communications systems in broad use globally.

Radar architectures can be classified as mono-static and multi-static. In a mono-static radar architecture, the transmitter and receiver are co-located. In a multi-static architectures, transmission is performed by one radio and reception is performed by one (or more than one) radio at a separate location.

Mono-static radar architectures are generally simpler, e.g., by making use of a single radio architecture to limit challenges with time and frequency synchronization. Mono-static radar architectures may have issues with a lack of signal diversity. Mono-static radar architectures may offer poor performance in non-LOS scenarios, or may have sub-optimal detection performance with objects of small RCS. Detection performance and range may be increased with multi-static architectures at the cost of implementation complexity required to coordinate transmission and reception between multiple disparate radios.

Wireless communications radios may be used in both mono-static and bistatic radar architectures, where the reflections of the transmitted signal may be observed by the radio that originally made the transmission or the device that was configured to receive it. Mono-static architectures, however, may have issues with a minimum ranging distance, due to differences in waveform design between radar systems and communications systems. Unless wireless devices have full-duplex capability, large transmission periods can result in impractically large minimum ranging distances. This limitation can be overcome with multi-static or bistatic architectures, although network topologies need to enable point-to-point and point-to-multi-point transmission for optimal design.

Communications hardware may be used for wireless sensing. Making use of communications hardware for wireless sensing enables new classes of services that can be deployed rapidly and achieve fast market penetration with little infrastructure expense, owing to the ubiquity of such communications hardware now present in wireless handsets, vehicles, and IoT devices. New applications that have been demonstrated in proof-of-concept are shown in Table 1.

TABLE 1

Use cases and applications of wireless sensing technologies

| Use Case | Applications |
| --- | --- |
| Health Monitoring | Heartbeat Detection |
|  | Respiration Rate Monitoring |
|  | Sleep Apnea Detection |
|  | Fall Detection |
| Gesture Recognition | Human Activity Recognition |
|  | Keystroke Detection |
|  | Sign Language Recognition |
|  | Lip Motion Recognition |
| Context Acquisition | Localization |
|  | Direction Finding |
|  | Range Estimation |
| Device Authentication | Access Control |
|  | Intrusion Detection |
|  | Abnormality Detection |

Joint communication and sensing may be referred to herein as a technology that provides communication devices with RF sensing and radar capabilities. The RF sensing and radar capabilities are built on an enhanced communication framework (e.g., RF sensing and communication share a common communication framework (e.g., channel/time-freq resources) or/and device hardware).

5G technologies and systems are designed to operate in the upper frequency bands, for example in the 28 GHz band and bands above 28 GHz band. This indicates a convergence of the frequency bands used by different technologies, such as radar and mobile communication systems. Given the convergence of the frequency bands between radar and mobile communications and the ubiquity of consumer devices with radar capability, technologies that can jointly handle communications and sensing on the same architecture/platform may be more cost effective and have lower complexity as compared to two independent platforms.

Use of joint communication and sensing capable nodes will enable a broad range of applications, such as:

Indoor sensing: nodes can detect and monitor physical activity, which may further be enhanced with activity classification, to classify human movement, posture, fall detection, vitals monitoring (e.g. heart beat), intrusion detection and more.

Automotive/V2X: nodes perform simultaneous radar and V2X communications, and may perform real-time updates of the environment and road maps.

Industrial IoT applications: large scale deployment of nodes enables warehouse indoor localization.

Real-time radio-environment maps built using enhanced communication devices.

The following terminology may be used herein:
radar: radio detection and ranging
JCS: refers to joint communication and sensing technologies or systems.
RadCOM: refers to joint radar and communication technologies or systems.
JCS and RadCOM may be used interchangeably herein.
JCS-RS: joint communications and sensing reference signal
TRP: transmission and reception point
CSI-RS: channel state information reference signal
RNTI: radio network temporary identity
C-RNTI: cell RNTI
DCI: downlink control information
CRC: cyclic redundancy check
SR: scheduling request A WTRU can sense its surroundings using in-band sensing signals, e.g., using existing reference signals (RSs) and/or RSs that may be designated for radar sensing (collectively "JCS-RS"). The WTRU may transmit the sensing signals interspersed with resource elements of a wireless communications system.

Provided herein are technologies and methodologies for carrying out JCS by enabling mono-static sensing. In various embodiments, signaling overhead may be minimized. A WTRU may require different sensing qualities (e.g., spatial resolution, temporal resolution, periodicity, etc.) at different timings (e.g., at different stages of a vehicle's motion in the case of V2X) or/and in different directions or in different geographical locations (e.g., in regions having disparate traffic expectations). As such, switching may occur frequently. Additionally, the network may change the WTRU's sensing configuration dynamically. The sensing configuration may be changed for various reasons, such as scheduling, load balancing, etc. Pursuant to the technologies and methodology provided herein, a WTRU may request and/or be configured with different tiers of resources for JCS and may switch from one to another dynamically.

In some instances, JCS based radar sensing may be limited by Line-of-Sight (especially at higher carrier frequencies) and Tx power constraints. Pursuant to the technologies and methodologies provided herein, a WTRU may fill gaps in coverage and/or extend its sensing range by sharing sensing data with neighboring WTRUs. The technologies and methodologies herein enhance the wireless communication framework so as to enable efficient sharing of sensor data between neighboring WTRUs.

Overview

As would be appreciated by a person of skill in the art based on the teachings herein, encompassed within the embodiments described herein, without limitation, are procedures, methods, architectures, apparatuses, systems, devices, and computer program products directed to WTRU-initiated active sensing. Among the procedures, methods, architectures, apparatuses, systems, devices, and computer program products is a first method that may be implemented in a WTRU and may include any of: receiving, from a network element of a wireless communications system, first information indicating an activation of at least a first sensing configuration of a plurality of sensing configurations, wherein the first sensing configuration comprises second information indicating one or more time and frequency resources of the wireless communications system; transmitting a first sensing signal according to the first sensing configuration and using the one or more first time and frequency resources; performing one or more first measurements related to the first sensing signal; transmitting, to the network element, third information indicating a change from the first sensing configuration to a second sensing configuration of the plurality of sensing configurations; receiving, from the network element, fourth information indicating an acknowledgment of the change from the first sensing configuration to the second sensing configuration; transmitting a second sensing signal according to the second sensing configuration and using the one or more second time and frequency resources; and performing one or more second measurements related to the second sensing signal.

In various embodiments, the first method may include any of: receiving, from the network element, sixth information indicating to change to a third sensing configuration of the plurality of sensing configurations, wherein the third sensing configuration comprises seventh information indicating one or more third time and frequency resources of the wireless communications system; transmitting a third sensing signal according to the third sensing configuration and using the one or more third time and frequency resources; and performing one or more third measurements related to the transmitted third sensing signal.

Among the procedures, methods, architectures, apparatuses, systems, devices, and computer program products is a second method that may be implemented in a WTRU and may include any of: receiving, from a network element of a wireless communications system, first information indicating an activation of at least a first sensing configuration of a plurality of sensing configurations, wherein the first sensing configuration comprises second information indicating one or more time and frequency resources of the wireless communications system; transmitting a first sensing signal according to the first sensing configuration and using the one or more first time and frequency resources: performing one or more first measurements related to the first sensing signal; receiving, from the network element, third information indicating a change from the first sensing configuration to a second sensing configuration of the plurality of sensing configurations; transmitting, to the network element, fourth information indicating an acknowledgment of the change from the first sensing configuration to the second sensing configuration; transmitting a second sensing signal according to the second sensing configuration and using the one or more second time and frequency resources; and performing one or more second measurements related to the second sensing signal.

In various embodiments, the second method may include any of: transmitting, to the network element, sixth information indicating a change to a third sensing configuration of the plurality of sensing configurations, wherein the third sensing configuration comprises seventh information indicating one or more third time and frequency resources of the wireless communications system; transmitting a third sensing signal according to the third sensing configuration and using the one or more third time and frequency resources; and performing one or more third measurements related to the transmitted third sensing signal.

In various embodiments, at least one of the first and second methods may include transmitting, to the network element, fifth information indicating any of a first value for a first parameter of the first sensing configuration and a second value for a second parameter of the second sensing configuration.

In various embodiments, at least one of the first and second methods may include triggering the WTRU to perform sensing based on a first event, wherein the first event is any of a request from a higher layer application and a timing configuration.

In various embodiments, at least one of the first and second methods may include triggering transmission of the fourth information based on a second event.

Among the procedures, methods, architectures, apparatuses, systems, devices, and computer program products is a first WTRU comprising circuitry, including a transmitter, a receiver, a processor and memory, that may be configured to: receive, from a network element of a wireless communications system, first information indicating an activation of at least a first sensing configuration of a plurality of sensing configurations, wherein the first sensing configuration comprises second information indicating one or more time and frequency resources of the wireless communications system; transmit a first sensing signal according to the first sensing configuration and using the one or more first time and frequency resources; perform one or more first measurements related to the first sensing signal; transmit, to the network element, third information indicating a change from the first sensing configuration to a second sensing configuration of the plurality of sensing configurations; receive, from the network element, fourth information indicating an acknowledgment of the change from the first sensing configuration to the second sensing configuration; transmit a second sensing signal according to the second sensing configuration and using the one or more second time and frequency resources; and perform one or more second measurements related to the second sensing signal.

In various embodiments, the first WTRU may be configured to: receive, from the network element, sixth information indicating to change to a third sensing configuration of the plurality of sensing configurations, wherein the third sensing configuration comprises seventh information indicating one or more third time and frequency resources of the wireless communications system; transmit a third sensing signal according to the third sensing configuration and using the one or more third time and frequency resources; and perform one or more third measurements related to the transmitted third sensing signal.

Among the procedures, methods, architectures, apparatuses, systems, devices, and computer program products is a second WTRU comprising circuitry, including a transmitter, a receiver, a processor and memory, that may be configured to: receive, from a network element of a wireless communications system, first information indicating an activation of at least a first sensing configuration of a plurality of sensing configurations, wherein the first sensing configuration comprises second information indicating one or more time and frequency resources of the wireless communications system; transmit a first sensing signal according to the first sensing configuration and using the one or more first time and frequency resources; perform one or more first measurements related to the first sensing signal; receive, from the network element, third information indicating a change from the first sensing configuration to a second sensing configuration of the plurality of sensing configurations; transmit, to the network element, fourth information indicating an acknowledgment of the change from the first sensing configuration to the second sensing configuration; transmit a second sensing signal according to the second sensing configuration and using the one or more second time and frequency resources; and perform one or more second measurements related to the second sensing signal.

In various embodiments, the second WTRU may be configured to: transmit, to the network element, sixth information indicating a change to a third sensing configuration of the plurality of sensing configurations, wherein the third sensing configuration comprises seventh information indicating one or more third time and frequency resources of the wireless communications system; transmit a third sensing signal according to the third sensing configuration and using the one or more third time and frequency resources; and perform one or more third measurements related to the transmitted third sensing signal.

In various embodiments, at least one of the first and second WTRUs may be configured to transmit, to the network element, fifth information indicating any of a first value for a first parameter of the first sensing configuration and a second value for a second parameter of the second sensing configuration. In various embodiments, at least one of the first and second WTRUs may be configured to trigger the WTRU to perform sensing based on a first event, wherein the first event is any of a request from a higher layer application and a timing configuration. In various embodiments, at least one of the first and second WTRUs may be configured to trigger transmission of the fourth information based on a second event.

In various embodiments, the first information may include a first identifier of the first sensing configuration. In various embodiments, the fourth information may include a second identifier of the second sensing configuration.

In various embodiments, each of the first and second parameters may include one of one or more sensing directions, one or more beam widths, a number of repetitions and a transmit power. In various embodiments, any of the first and second sensing signals may be a reference signal. In various embodiments, each of the first and second sensing configurations may define a sensing scheme for supporting a resolution level. In various embodiments, each of the first and second sensing configurations indicates or includes any of a number of sensing cycles, a time duration, a periodicity of sensing cycles, one or more directions of sensing, a beam width of a directional transmission, a number of repetitions, a bandwidth, a bandwidth span, a number of physical resource blocks (PRBs), a number of resource elements (REs), a density in a frequency domain, and a transmit power.

In various embodiments, the fourth information may be transmitted as, or included in, any of a control message and a configuration message. In various embodiments, the second event may be when, or on a condition that, the WTRU determines to switch to a sensing configuration other than the first sensing configuration.

A WTRU may perform at least one of the following actions, for example, to support JCS:

The WTRU may detect an event that triggers the WTRU to perform mono-static sensing. The event may be any of an explicit and implicit request to report sensing measurements and/or sensing results. The WTRU may receive the request to report sensing measurements/results from upper layers.

The WTRU may transmit a request ("resource request") to allocate one or more resources of a wireless communication system ("resource allocation") to the WTRU for performing mono-static sensing. The WTRU may transmit the resource request to a base station (e.g., a gNB) and/or toward another network element via the base station. The resource request may indicate and/or include a basis for the requested configuration. The basis may be one or more proposed sets of sensing parameters (each a "sensing parameter set"). Each sensing parameter set may include various parameters; at least some of which may define a scheme ("sensing scheme") for performing mono-static sensing. Each sensing scheme may be configured based on, e.g., based on performing sensing in accordance with, one (e.g., one particular) resolution level of various resolution levels.

Each resolution level may be based on one type of resolution ("resolution type") or a combination of resolution types. The resolution types may include a range resolution, angular resolution, etc.

The WTRU may receive a response ("configuration response") indicating and/or including one or more sensing configurations (collectively "a sensing configurations set"). The WTRU may receive the configuration response from a base station (e.g., a gNB) and/or from another network element via the base station.

One, some or all of the sensing configurations may define one or more resources allocated for one or more sensing configurations. Each of the sensing configurations may define a granted sensing parameter set. Each granted sensing parameter set may be based on one or more of the proposed sensing parameter set indicated by and/or included in the resource request. In an embodiment, at least some of the granted sensing parameter sets may have a one-to-one correspondence with at least some of the proposed sensing parameter sets. In an embodiment, at least some of the granted sensing parameter sets may define sensing schemes different from the any of the sensing schemes of the proposed sensing parameter sets. In an embodiment, at least some of the granted sensing parameter sets may define sensing schemes different from the any of the sensing schemes of the proposed sensing parameter sets, where such granted sensing schemes and at least some of the proposed sensing parameter sets are configured based on corresponding resolution levels. Each sensing scheme may be configured based on, e.g., based on performing sensing in accordance with, one (e.g., one particular) resolution level of various resolution levels. Each resolution level may be based on one type of resolution ("resolution type") or a combination of resolution types.

Each of the sensing configurations may indicate, or include an indication of, whether such configuration is initially active or activated. One, some or all of the sensing configurations may be initially active or activated. The WTRU may determine which of the sensing configurations may be initially active or activated based on the indications.

The WTRU may perform mono-static sensing based on one or more active or activated sensing configurations of the sensing configurations set. The WTRU, for example, may transmit a sensing signal using the allocated resources and the granted sensing parameter set of one ("a first") active or activated sensing configurations, and may perform one or more measurements related to the transmitted sensing signal. The WTRU, for example, may measure a power of a backscatter associated with (e.g., resulting from) the transmitted sensing signal. The sensing signal may be or include one or more reference signals (RSs). Examples of such RSs may include conventional RSs, such as demodulation reference signals (DMRS), and one or more new RSs defined specifically for backscatter measurements. Such new RSs may be reference signals with specific time-frequency characteristics that enable appropriate sensing (e.g., resolution).

The WTRU may report the measurements related to the transmitted sensing signal, e.g., to upper layers. The WTRU may generate a measurement report based on such measurements and/or include the measurements therein. The WTRU may send the measurement report to upper layers.

The WTRU may perform another mono-static sensing based on another ("a second") sensing configuration of the sensing configurations set. The WTRU, for example, may transmit a second sensing signal using allocated resources and the granted sensing parameter set of the second sensing configuration, and may perform one or more measurements related to the second sensing signal. The WTRU may determine and/or confirm that the second sensing configuration is active or activated prior to, during or otherwise in connection with carrying out sensing. The second sensing configuration may correspond to a different ("second") resolution level than the resolution level corresponding to the first sensing configuration. The WTRU may report the measurements related to the transmitted second sensing signal, e.g., to upper layers. The WTRU may generate a measurement report based on such measurements and/or include the measurements therein. The WTRU may send the measurement report to upper layers.

The WTRU may determine to perform sensing for a resolution level different from a current resolution (e.g., all current resolutions). The WTRU may make such determination based on a request from higher layers, a configured sensing timing and/or responsive to a determination that sensing measurements based on the current resolution level fail to satisfy a threshold.

The WTRU may check the configured sensing configurations set for a ("third") sensing configuration that corresponds to the different ("third") resolution level. On condition that the third sensing configuration is present in the configured sensing configurations set, the WTRU may determine whether the third sensing configuration is active or activated and/or whether the third sensing configuration includes allocated resources. On condition that the third sensing configuration is active or activated, the WTRU may perform sensing based on the third sensing configuration. The WTRU may perform sensing as previously described using the third sensing configuration and may carry out reporting of the sensing measurements in the same ways as previously described.

On condition that the third sensing configuration is inactive or deactivated and/or it does not include allocated resources, the WTRU may transmit a request ("activation/reconfiguration request") to switch to the third sensing configuration. The WTRU may transmit the activation/reconfiguration request to a base station (e.g., a gNB) and/or toward another network element via the base station. The activation/reconfiguration request may be transmitted as any of a control message and a (re) configuration message. The activation/reconfiguration request may indicate and/or include any of the third sensing configuration, a (e.g., a requested) resolution level, etc.

The WTRU may receive an acknowledgement of receipt of the activation/reconfiguration request from the base station and/or other network element. The WTRU may interpret the acknowledgement as an implicit notification that the third sensing configuration is no longer inactive or deactivated and ready to use. The WTRU, based on such interpretation, may perform sensing using the third sensing configuration. The WTRU may carry out the sensing in the same way as previously described but after a configured time offset following the reception of the acknowledgment. The WTRU may carry out reporting of the sensing measurements in the same ways as previously described.

Alternatively, the WTRU may receive an explicit activation notification that the third sensing configuration is no longer inactive or deactivated and ready to use and/or an activation command (explicit or implicit) to activate the third sensing configuration. The WTRU, based on the activation notification or activation of the third sensing configuration, may perform sensing as previously described using the third sensing configuration. The WTRU may carry out the sensing in the same way as previously described but after a configured time offset following the reception of the explicit activation notification. The WTRU may carry out reporting of the sensing measurements in the same ways as previously described.

As another alternative, the WTRU may receive a configuration response indicating and/or including a reconfigured third sensing configuration, e.g., if the earlier configured third sensing configuration lacked allocated resources and/or to incorporate revisions made to the granted sensing parameter set pursuant to the signaled resource level. The WTRU may receive the configuration response from the base station and/or other network element. The WTRU may perform sensing as previously described using the reconfigured third sensing configuration. The WTRU may carry out the sensing in the same way as previously described but after a configured time offset following the reception of the configuration response. The WTRU may carry out reporting of the sensing measurements in the same ways as previously described.

If the third sensing configuration is not present in the configured sensing configurations set, the WTRU may transmit an activation/reconfiguration request to request resource allocation for a proposed sensing parameter set corresponding to the different ("third") resolution level and/or other proposed sensing parameter set (collectively "third proposed sensing parameter set"). The activation/reconfiguration request may indicate and/or include the third proposed sensing parameter set. The WTRU may transmit the activation/reconfiguration request to a base station (e.g., a gNB) and/or toward another network element via the base station. The activation/reconfiguration request may be transmitted as any of a control message and a (re) configuration message.

The WTRU may receive an acknowledgement of receipt of the activation/reconfiguration request from the base station and/or other network element. The WTRU may receive a configuration response indicating and/or including a second sensing configurations set. The WTRU may receive the configuration response from a base station (e.g., a gNB) and/or from another network element via the base station.

The second sensing configurations set may include one or more configurations, including one ("a fourth") sensing configuration that is active and that has allocated resources and a granted sensing parameter set based on the requested sensing parameter set corresponding to the different ("third") resolution level. The WTRU may determine and/or confirm that the fourth sensing configuration is active or activated prior to, during or otherwise in connection with carrying out sensing.

The WTRU may perform mono-static sensing based on the fourth sensing configuration. The WTRU, for example, may transmit a third sensing signal using the allocated resources and the granted sensing parameter set of the fourth sensing configuration. The WTRU may transmit the third sensing signal after a configured time offset following the reception of the second sensing configurations set. The WTRU may perform one or more measurements related to the third sensing signal.

The WTRU may report the measurements related to the transmitted third sensing signal, e.g., to upper layers. The WTRU may generate a measurement report based on such measurements and/or include the measurements therein. The WTRU may send the measurement report to upper layers.

The WTRU may receive an indication (e.g., from a gNB) to activate or deactivate (e.g., start or stop using) a single sensing configuration, an entire sensing configurations set, or a subset of the sensing configurations of an entire sensing configurations set. As an example, the WTRU may receive a MAC control element (CE) ("MAC-CE") defining a multi-element bitmap. In an embodiment, each element may be mapped to a single configured sensing configuration such that if such element is one value (e.g., "0") the corresponding configured sensing configuration is activated and if it is the other value (e.g., "1"), the corresponding configured sensing configuration is deactivated. In an embodiment, each element may be mapped to a plurality of configured sensing configurations such that if such element is one value (e.g., "0") the corresponding configured sensing configurations are activated and if it is the other value (e.g., "1"), the corresponding configured sensing configurations are deactivated. In an embodiment, the WTRU may receive a separate indication to activate (or deactivate) each configured sensing configuration.

The WTRU may start/continue or stop transmissions (e.g., sensing signal transmissions) using the sensing configuration in accordance with the activation indication or deactivation indication, respectively, for example, after a configured time offset from the receipt of the activation indication or deactivation indication that may be received in a MAC-CE The WTRU may start/continue or stop measurements associated with a sensing signal transmission, for example when the WTRU starts/continues or stops the transmission based on receipt of an activation indication or deactivation indication, respectively The WTRU may receive configuration, capability or support information from a base station (e.g., a gNB) and/or from another network element via the base station. The configuration, capability or support information may indicate and/or include a sensing configurations set. One, some or all of the sensing configurations of the sensing configurations set may define one or more resources. Each of the sensing configurations may define a sensing parameter set.

The WTRU may request to activate one or more of the sensing configurations (e.g., as indicated in the configuration, capability or support information).

The WTRU may receive a configuration response, e.g., from the gNB, indicating and/or including a sensing configuration that may correspond to or comply with the WTRU's request.

The WTRU may receive a configuration change, e.g., from a gNB, that may be a group configuration change where the configuration change may change the sensing quality (e.g., resolution, periodicity, etc.) for one or more WTRUs (e.g., for a cell or all WTRUs in the cell).

The WTRU may receive a configuration change via system information, RRC signaling, etc.

The terms "resource request", "JCS-RS resource request" and "JCS resource request" may be used interchangeably herein. The terms "configuration response", "JCS-RS resource allocation", "JCS resource grant" and "JCS configuration response" may be used interchangeably herein. The terms "performing transmission" and "transmitting" may be used interchangeably herein.

Configuration of JCS measurements may be carried out. A WTRU or an element of the WTRU, such as, for example, a MAC entity of the WTRU, may determine to perform sensing of its surroundings (environment). The determination may be based on an event. The event may be a request from upper layers, for example. The WTRU, for example, may detect (e.g., receive from a sensing based application at the WTRU) any of an explicit and implicit request to report sensing measurements.

Alternatively, the event may be based on a configuration. For example, the WTRU may be configured with an activation time, a schedule or other configured time for performing sensing, and the event may be, or may be based on, any of such configured timing. Examples of the configured timing of sensing may include any of a periodicity, a start time, a stop time, a slot, a subframe, a frame number, other specific set of time units. The WTRU may receive the configuration, for example, by higher layer signaling such as any of RRC signaling, system information, and in a common or a WTRU-specific DCI.

Resource allocation may be carried out. A WTRU may send a JCS resource request to a gNB to allocate one or more resources to the WTRU for, inter alia, sensing signal transmissions. The WTRU may indicate its intent or capability to make such transmissions and/or related measurements in the JCS resource request, capability signaling/message or other signaling/message.

The WTRU may send any of the JCS resource request and/or capability, for example, after the WTRU determines to perform sensing. The WTRU may determine to perform sensing, for example, after receiving a request from higher layers (e.g., from an application of the WTRU) or based on a configured timing (e.g., when sensing is requested from the gNB).

Allocating resources, allocating grants, configuring grants and configuring resources may be used interchangeably herein.

The WTRU may send a resource request to the gNB to allocate (grant) to the WTRU resources, for example, for one or more resolution levels (e.g., a high-resolution level, a low-resolution level, etc.). Each of the resolution levels may define one type of resolution ("resolution type") or more than one resolution type (e.g., a combination of two or more resolution types). Examples of the resolution types may include range resolution, temporal resolution, spatial resolution and/or angular resolution. Each resolution type may define based on a corresponding physical quantity, e.g., range for range resolution, time for a temporal resolution, space for spatial resolution and angle for angular resolution. For example, a range resolution may define a minimum distance between two (or more) targets that can be supported whereby the targets can be distinguished from one another. A temporal resolution, for example, may define a minimum time interval to detect change, e.g. object movement. A spatial resolution, for example, may define a size of a minimally detectable object. An angular resolution, for example, may define minimum difference between the two angle-of-arrivals (e.g., directions of arrival of the reflected signals) that can be supported whereby the targets at both angle-of-arrivals can be distinguished.

One or more of the resolution levels that may be required or supported may be configured and/or provided to the WTRU, e.g., by a sensing application, via signaling from a gNB, other network element, etc. The WTRU may receive one or more of the resolution levels with other information, such as a timing configuration. Higher layer signaling and/or system information may be used to communicate the resolution levels and/or the other information.

The JCS resource request may indicate and/or include one or more sensing parameter sets. Any of the sensing parameters set may include any of:
 a number of sensing cycles;
 a time duration (e.g., a maximum time duration);
 a periodicity of sensing cycles (e.g., minimum periodicity of sensing cycles);
 one or more directions of sensing (e.g., for multi-directional radar measurements);
 a beam-width of each directional transmission (e.g., for multi-directional radar measurements);
 a number of repetitions;
 a bandwidth (e.g., minimum bandwidth);
 a bandwidth span (e.g., minimum bandwidth span);
 a number of physical resource blocks (PRBs) (e.g., minimum number of PRBs);
 a number of resource elements (REs) (e.g., minimum number of REs);
 a density in frequency domain (e.g., a number of PRBs for the given bandwidth or number of REs per PRB for the given bandwidth/number of PRBs);
 a minimum density in a frequency domain (e.g., a minimum density in the frequency domain); and
 a transmit power (e.g., a minimum transmit power).

The WTRU may carry out sensing (e.g., triggered based on the configured timing or a request from a sensing application) using one or more sensing cycles. A sensing cycle may include transmission of one or more sensing signals followed by making measurements (e.g., backscatter measurements) on the transmitted sensing signals.

The number of sensing cycles may be expressed as a positive integer, where each integer n represents n sensing cycles the WTRU carries out when performing sensing. Each sensing cycle involves (i) a transmission period in which the WTRU may transmit one or more sensing signals, and (ii) a measurement period in which the WTRU may make measurements (e.g., backscatter measurements) on the transmitted sensing signals. The measurement period may partially overlap with the transmission period such that the WTRU may begin making measurements of the sensing signals already transmitted prior to all of the sensing signals for such cycle being transmitted. In an embodiment, the number of sensing may be a total number of sensing cycles the WTRU carries out when performing sensing. The number of sensing cycles may be expressed as a real number, where each whole number n represents n complete sensing cycles and the fractional part represents an amount of time (e.g., corresponding to a fraction of the time for a complete cycle).

The time duration may be expressed as a number of any of symbols, slots, subframes, etc. and may represent an amount of time for the WTRU to perform the sensing after it is initiated. The minimum periodicity may refer to a maximum period (e.g., a number of symbols, slots, subframes, etc.) between consecutive sensing cycles.

The directions of sensing may refer to the information of the target directions (e.g., beam directions) of sensing signal transmissions (e.g., directional JCS-RS transmissions) of each sensing cycle. The directions of sensing may indicate the WTRU intends to carry out multi-directional radar measurements in case of beamformed based sensing signal transmissions (e.g., directional JCS-RS transmissions). This information along with the other information of the WTRU (e.g., location, transmit power of WTRU transmissions) may assist the network (e.g., gNB) in efficiently deriving resource allocation. For example, the same resource can be allocated to multiple WTRUs with minimum mutual interference.

The directions of sensing may be and/or correspond to any of the following:
 a relative direction with respect to a reference associated to, or selected by, the WTRU. For example, the relative direction may be relative to an angle of arrival of the downlink synchronization signal block (SSB) selected by the WTRU (e.g., for Random Access Channel association and transmission). For each of the target directions of the sensing signal transmission, azimuth (e.g., horizontal) and elevation (e.g., vertical) angles relative to the angle of arrival of the selected downlink SSB (e.g., in terms of angular units such as degrees, minutes, seconds) may be indicated to the network (e.g., gNB).

absolute directions in terms of degrees, minutes, seconds with respect to a global reference, e.g., compass bearing.

named directions such as north, south-east, etc.

The beam width may refer to the antenna beam width the WTRU may use for each of the beamformed based sensing signal transmissions (e.g., directional JCS-RS transmissions). For each of the directional transmissions, the beam width may be specified in two orthogonal directions, with reference to a beam pointing direction. The beam width may be expressed in angular units, such as degrees, minutes, seconds, etc.

The number of repetitions (e.g., in time-domain) may refer to the number of sensing signal transmissions (e.g., JCS-RS transmissions) and measurements (e.g., backscatter measurements) the WTRU carries out during each sensing cycle. The number of repetitions may be, for example, a number of repeated transmissions in time-domain in each sensing cycle. In case of multi-directional radar measurements, the number of repetitions may refer to the number of sensing signal transmissions (e.g., JCS-RS transmissions) and measurements (e.g., backscatter measurements) the WTRU carries out in each direction. The WTRU, for example, may perform multiple sensing signal transmissions and measurements in a direction and may average of all the measurements to increase the accuracy of the measurements. A larger number of repeated transmissions (e.g., in time-domain), for example, may provide larger sensing range compared to a sensing range achieved by using a smaller number of repeated transmissions. In various embodiments, the WTRU may specify a different or a separate number of repetitions requirement for each direction/beam. The WTRU may do so when one (or some) of the directions/beams may require a different sensing range (e.g., smaller/larger) as compared to the other beams.

The minimum bandwidth or/and minimum number of PRBs or/and minimum number of REs along with minimum density in frequency domain (e.g., number of PRBs for the given bandwidth or number of REs per PRB for the given bandwidth/number of PRBs) may refer to the minimum resources in frequency domain that the WTRU intends to use for each sensing signal transmission (e.g., JCS-RS transmission). For example, a higher resolution of sensing may require larger bandwidth than the required bandwidth in a lower resolution sensing. For multi-directional radar measurements, the parameters may refer to the minimum resources in frequency domain that the WTRU intends to use for sensing signal transmission (e.g., JCS-RS transmission) in each target direction. For example, the WTRU may include one or more different or separate requirements (e.g., different minimum resources required in frequency domain) for each direction/beam for a given resolution level (e.g., high or low resolution), one of the directions/beams may require a different resolution level (e.g., lower/higher) compared to the other beams. The minimum bandwidth, alternatively, may be indicated via a minimum bandwidth span, which may include minimum and maximum frequency values.

The minimum transmit power may refer to a minimum power the WTRU may use for sensing signal transmissions (e.g., JCS-RS transmissions). A larger sensing range may require higher transmit power than the required transmit power for sensing a smaller range. For multi-directional radar measurements, the minimum transmit power may be indicated for each of the target directions (e.g., separate or single). This is because different directions, for example, may require different sensing/detection range.

One or more of the sensing parameters may be provided to the WTRU, e.g., from a requesting application of the WTRU. One or more of the sensing parameters may be provided to the WTRU from the gNB. One or more of the sensing parameters may be provided with a configuration timing. One, some or all of the sensing parameters may be associated with one or more resolution levels.

The WTRU may send a single resource request including and/or indicating the sensing parameter set (e.g., corresponding to multiple resolutions levels). Alternatively, the WTRU may send separate resource requests, including or indicating each of the sensing parameter sets.

The WTRU may send the resource request via higher layer signaling. For example, the WTRU may send the resource request in an information element (IE) of an RRC message. The RRC IE may be an existing IE or, for example, a new IE (e.g., a "SensingResourceRequest" IE) defined or used for this purpose. Alternatively, the WTRU may be configured with an uplink (UL) resource (e.g., an UL resource configuration) on which to transmit the resource request. The UL resource configuration may include at least one of: periodicity, time offset, prohibit timer, uplink control channel (e.g., PUCCH) configuration (e.g., format, time/frequency resources, etc.), etc. The UL resource configuration may be communicated to the WTRU, e.g., using higher layer (e.g., RRC) signaling, etc.

After transmitting a JCS resource request, the WTRU may monitor for a JCS configuration response (e.g., transmitted from a gNB). Monitoring for the JCS configuration response may include monitoring a downlink control channel, downlink control information (DCI) masked or scrambled (e.g., CRC scrambled) with a RNTI (e.g., RA-RNTI, C-RNTI, or JCS-RNTI) and/or a data channel (e.g., PDSCH) associated with the downlink control channel and/or the DCI for the JCS configuration. Monitoring the downlink control channel, the DCI and/or the associated data channel implies attempting to decode the downlink control channel, the DCI and/or a data channel and obtaining the JCS configuration response therefrom if present. Alternatively, the WTRU may receive the JCS configuration response via higher layer signaling. e.g., RRC signaling. For example, the WTRU may receive the JCS configuration response in an IE of an RRC message. The RRC message may be, for example, an RRC configuration message or/and an RRC re-configuration message. The RRC IE may be an existing IE or, for example, a new IE (e.g., a "Sensing-Config" IE) defined or used for this purpose. In an embodiment, the WTRU may receive the JCS configuration response via higher layer (e.g., RRC) signaling when the WTRU sends the JCS resource request using the higher layer (e.g., RRC) signaling. In an embodiment, the WTRU may receive the JCS configuration response via higher layer signaling/messaging when the WTRU sends the JCS resource request using lower layer signaling/messaging. In an embodiment, the WTRU may receive the JCS configuration response via lower layer signaling/messaging when the WTRU sends the JCS resource request using higher layer signaling/messaging The WTRU may be configured with a maximum time offset or window during which the WTRU is to monitor for the JCS configuration response after sending the JCS resource request. If the WTRU does not receive the JCS configuration response within the configured maximum window/time offset, then the WTRU may retransmit the JCS resource request or send another JCS resource request (e.g., at a later time). The WTRU may receive a configuration for the maximum time offset or window, which may be expressed in terms of symbols/slots/sub-frame/frames or an absolute time value, e.g., in system information and/or higher layer signaling.

Grant, allocation and resource allocation may be substituted for each other in the examples and embodiments described herein and still be consistent with this invention.

A resource may be a time-frequency resource. A resource set may be a set of time-frequency resources. Frequency may be in units of subchannels, resource blocks (RBs), among others. Time may be in units of one or more of symbols, slots, subframes, frames, among others. A resolution level may be a granted, configured, or requested resolution level.

A JCS configuration response may include one or more sensing configurations. Any of the sensing configurations may include one or more of the following parameters:

a sensing configuration ID or a sensing configurations set ID, where separate or different IDs may be configured or applied to different resolution levels configurations;

a number of sensing cycles or a time duration for which the sensing configuration remains valid after it is activated;

a periodicity of sensing cycles;

one or more directions of sensing (e.g., for multi-directional radar measurements);

a beam-width of each directional transmission (e.g., for multi-directional radar measurements) a number of repetitions or number of repetitions in each direction;

time-frequency resources, which may include any of:
a bandwidth span;
a density, which may be in terms of number of PRBs, may be over a given bandwidth, or may include a number of REs per PRB, and/or may be indicated as one or more of a set (e.g., a fixed set) of patterns which may be known/communicated configured to the UE, e.g. using system information or higher layer signaling, etc.; and
a starting symbol and/or a number of symbols (e.g., to be used for sensing signal transmission), where in various embodiments the number of symbols may be equally distributed (e.g., sequentially) among the number of repetitions/directions;
a covering code/sequence (e.g., for interference resolution, to distinguish from other transmissions, etc.);
a transmit power level (e.g., a maximum power per sensing cycle, a maximum power per direction or maximum power per RE per direction and/or a maximum power per PRB per direction); and
an active flag, which may be used by the WTRU to determine whether this sensing configuration may be used/activated or not after receiving the configuration.

In an embodiment, one or more of the sensing configurations may be activated simultaneously.

The WTRU may receive a single JCS resource response including and/or indicating the parameters for all of the sensing configurations. Alternatively, the WTRU may receive separate JCS resource responses, including or indicating the parameters, one for each sensing configuration or one for each subdivision of the sensing configurations set.

Activation/deactivation of a sensing configuration may be provided and/or used. The WTRU may receive an indication (e.g., from a gNB) to activate or deactivate (e.g., start or stop using) a single sensing configuration, an entire sensing configurations set, or a subset of the sensing configurations of an entire sensing configurations set. The activation indication and/or deactivation indication may be received via RRC signaling, MAC-CE or DCI. As an example, the WTRU may receive a MAC-CE defining a multi-element bitmap. In an embodiment, each element may be mapped to a single configured sensing configuration such that if such element is one value (e.g., "0") the corresponding configured sensing configuration is activated and if it is the other value (e.g., "1"), the corresponding configured sensing configuration is deactivated. In an embodiment, each element may be mapped to multiple configured sensing configurations such that if such element is one value (e.g., "0") the corresponding configured sensing configurations are activated and if it is the other value (e.g., "1"), the corresponding configured sensing configurations are deactivated. In an embodiment, the WTRU may receive a separate indication to activate (or deactivate) each configured sensing configuration. The activation and/or deactivation (e.g., indication of activation and/or deactivation) may include the sensing configuration ID.

A WTRU may undergo pre-configuration of gNB capability. A gNB may indicate any of a capability and a configuration to support different WTRU transmission resources (e.g., for sensing signal/JCS-RS). The capability/configuration may be indicated in system information or other RRC signaling. The WTRU may receive the capability or support information or configuration. The capability or support information or configuration may indicate one or more sensing configurations available for a WTRU to request (e.g., for JCS).

A sensing configuration may include any of the following:
a sensing configuration identity (e.g., ID);
time-frequency domain resource mapping, allocation, configuration, which may include one or more of the following parameters;
  a bandwidth span (e.g., minimum and maximum frequency or may be defined in terms of starting and ending PRB indices);
  density in frequency domain, which may be in terms of number of PRBs, may be over a given bandwidth, or may include a number of REs per PRB, and/or may be indicated as one or more of a set (e.g., a fixed set) of patterns;
  density in time domain, which may include number of symbols over one or more slots, may be given along with symbol indices in each slot. With this information, the WTRU may determine the number of repetitions or/and number of directions which can be supported with this resource configuration;
a periodicity (e.g., in terms number of symbols, slots, subframes, etc.) over which the given time-frequency resource allocation may be repeated;
total time duration (e.g., in terms number of symbols, slots, subframes, etc.) for which the sensing configuration remains valid once it is activated; and
transmit power level (e.g., maximum power per time-domain configured resources or maximum power per symbol or maximum power per RE per symbol or maximum power per PRB per symbol).

The WTRU may determine a sensing configuration that it may activate or use. The WTRU may send an activation/reconfiguration request (e.g., a JCS-RS resource request) or other message (e.g., to the gNB) to activate one or more sensing configurations, for example when the WTRU determines to perform sensing or measurements. The activation/reconfiguration request may be for (or may indicate) the determined sensing configuration.

The WTRU may indicate the sensing configuration identity (e.g., sensing configuration ID) for the determined sensing configuration (e.g., the configuration that the WTRU may activate or use). The WTRU may select the sensing configuration based on a sensing requirement, for example, based on the resolution level that needs to be achieved.

In various embodiments, the WTRU may provide a list or indicate a set of sensing configurations (e.g., list or set of sensing configuration IDs). The gNB may select one of the configurations for the WTRU, for example, based on its scheduling or load-balancing constraints.

The WTRU may determine multiple configurations, where for example one or more configurations may be able to fulfill the sensing requirements fully or at least partially. The list may be ordered, for example based on priority (e.g., WTRU's first choice, second choice, etc.). For example, if the gNB cannot allocate the first sensing configuration of the list, then it can choose the second one in the list, where the second sensing configuration, for example, may require fewer resources compared to the first sensing configuration. If the gNB cannot allocate either the first or second, it can choose the third one in the list, so on.

In addition to the sensing configuration or the list of sensing configurations (e.g., sensing configuration IDs), for each sensing configuration, the WTRU may include any of the following parameters in the request:
- direction(s) of sensing (in case of multi-directional radar measurements);
- beam width of each directional transmission (e.g., for multi-directional radar measurements)
- a number of repetitions or a number of repetitions in each direction; and
- a minimum transmit power level.

The WTRU may include one or more sensing parameters in the request, for example for each sensing configuration.

The number of supported directions and the repetitions may be determined for each sensing configuration based on the time-frequency density parameters of the sensing configuration.

The request may be sent using the configured UL resources over the UL control channel or UL shared channel or may be using higher layer signaling (e.g., RRC).

After transmitting a request to activate a configuration (e.g., for JCS), the WTRU may monitor for a response (e.g., a JCS-RS resource activation), for example from the gNB. The response may be received over a downlink control channel or DCI that may be masked or scrambled (e.g., CRC scrambled) with a RNTI, e.g., RA-RNTI or JCS-RNTI. The control channel or DCI may include the response or may be associated with a data channel (e.g., PDSCH) that may carry the response. Alternatively, the response may be received using a downlink MAC-CE (e.g., a JCS resource activation MAC-CE). Alternatively, the response may be received using a higher layer signaling, e.g., receiving a RRC message. A maximum time offset or window may be configured to the WTRU (e.g., in system information or in higher layer signaling) for monitoring the reception (e.g., from the gNB) after sending the request. If the WTRU does not receive a response within the configured maximum window/time offset, the WTRU may send another request (e.g., at a later time).

The response (e.g., from the gNB) may include any of the following parameters;
- a sensing configuration ID, e.g., an ID of the granted sensing configuration; and;
- a transmit power level (e.g., a maximum power per sensing cycle or a maximum power per direction or a maximum power per RE per direction or a maximum power per PRB per direction); and
- a covering code/sequence.

A WTRU may perform transmission of sensing signal (e.g., JCS-RS)_and measurement. After receiving a response (e.g., from the gNB) indicating and/or including the sensing configuration or grant or activation (e.g., for JCS-RS transmissions), the WTRU may activate (or start using) the resources of the resource configuration for the resolution level(s) indicated as active or enabled. Indication of active or enabled may be via a parameter "active flag" configured to "enabled" (e.g., the value is set to "1"). Alternatively, the WTRU may activate the sensing configuration indicated or allocated or granted (e.g., as a configuration id) in the response (e.g., from the gNB).

If the response is received in a downlink control channel transmission or DCI, the WTRU may be configured with a time offset (e.g., in terms of symbols, slots, subframe, frames or in terms of absolute time unit) to determine when the sensing configuration becomes active after receiving the response. Alternatively, if the response is received in a downlink shared/data channel (e.g., PDSCH) transmission, the WTRU may be configured with a time offset (e.g., in terms of symbols, slots, subframe, frames or in terms of absolute time unit) to determine when the granted sensing configuration becomes active after sending the HARQ-ACK for the received downlink data channel transmission including the grant. The configuration of time offset(s) may be communicated to the WTRU, e.g., in the response indicating and/or including the sensing configuration or grant or activation or as a part of the higher layer signaling (e.g., RRC signaling) or in the system information, etc.

For each of the active sensing configurations (e.g., to perform sensing measurements), the WTRU may perform sensing signal transmissions (e.g., RSs and/or JCS-RSs) on the allocated resources (e.g., after applying the configured time offset). The WTRU may be configured with REs for sensing signal transmissions (e.g., RSs and/or JCS-RSs), where, for example, those REs may be time/frequency multiplexed with REs including the uplink/downlink control/data for other applications or/and for other WTRUs.

After the JCS-RS transmissions (e.g., sensing signal/RS/JCS-RSs), the WTRU may monitor and estimate the backscatter channel corresponding to the transmission. To make backscatter measurements, the WTRU may perform any of the following:
- estimate the received power of the backscatter;
- estimate the phase of the backscatter;
- estimate the channel impulse response of the backscatter or/and relevant parameters of channel impulse response, e.g., round-trip-time, delay spread, path-loss, etc.;
- perform cross-correlation between the received backscatter and the preamble sequence used for transmission;
- estimate the angle of arrival of the backscatter, for example, with respect to the angle of departure of the preamble transmission;

For beam-based/directional transmissions, the WTRU may monitor and measure backscatter on the receive beam(s) corresponding to the transmit beam(s) (e.g., used to transmit the sensing signals).

Figure 2:
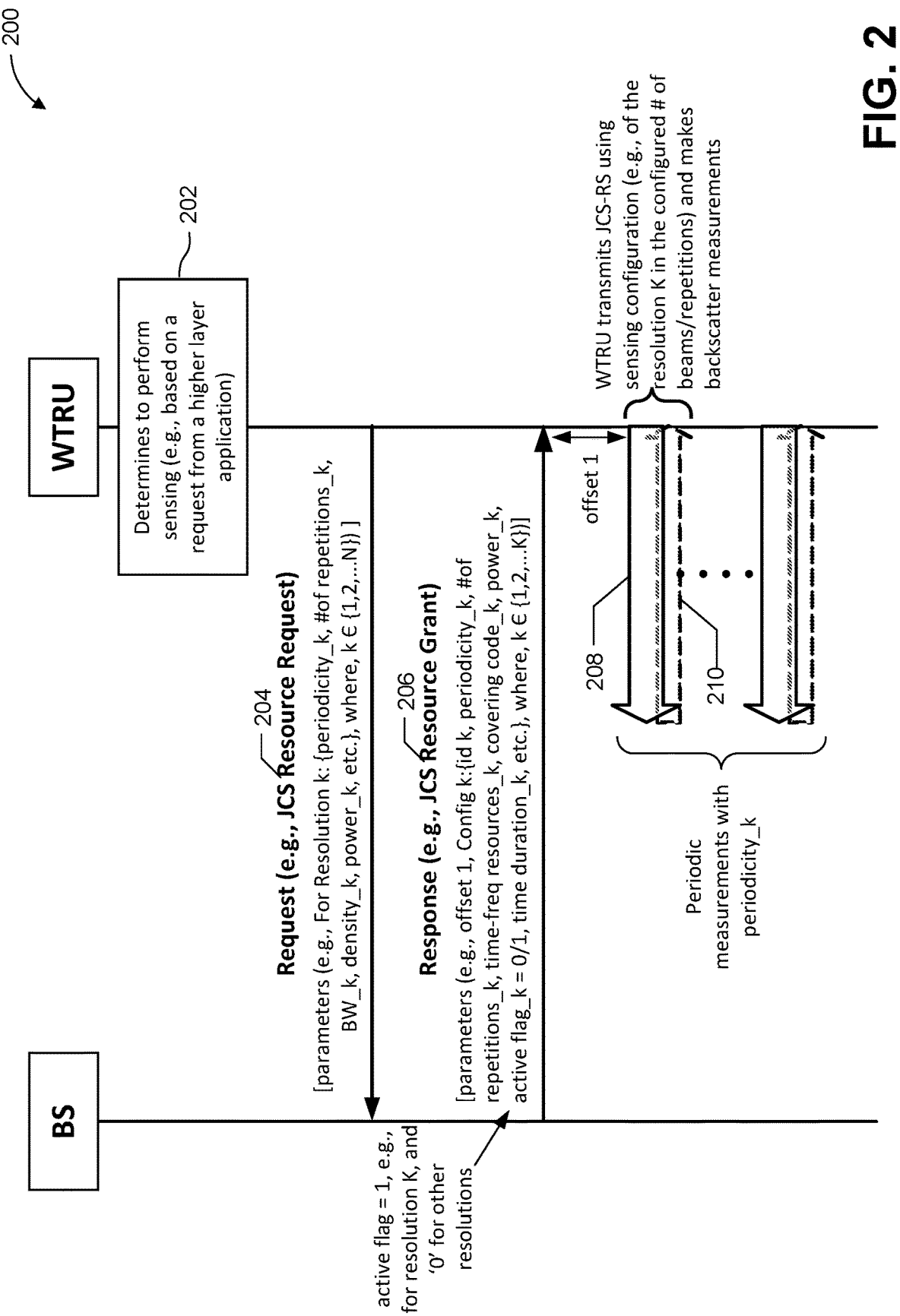
FIG. 2 shows an example procedure for performing WTRU-initiated active sensing using resources of a wireless communications system)

FIG. 2 shows an example procedure 200 for performing WTRU initiated active sensing using resources of a wireless communications systems. The procedure 200 may be suitable for performing WTRU initiated active sensing according to a sensing configuration autonomously selected from among a plurality of activated sensing configurations.

The WTRU may determine to perform sensing based on an event (202). That event may be, e.g., a sensing request received from a sensing application.

The WTRU may send to a gNB a resource request requesting resource allocation based on a set of N sensing configurations corresponding to N different resolution levels (204). The WTRU may receive a configuration response from the gNB (206). The configuration response may include a set of K sensing configurations corresponding to K resolution levels (where, for example, K<=N). The sensing configuration corresponding to the Kth resolution may indicate or include an indication that such sensing configuration is activated.

The WTRU may transmit a sensing signal using allocated resources and an granted sensing parameter set of the activated sensing configuration corresponding to the Kth resolution (208). The WTRU may perform one or more measurements related to (e.g., backscatter measurements of) the transmitted sensing signal (210).

Figure 3:
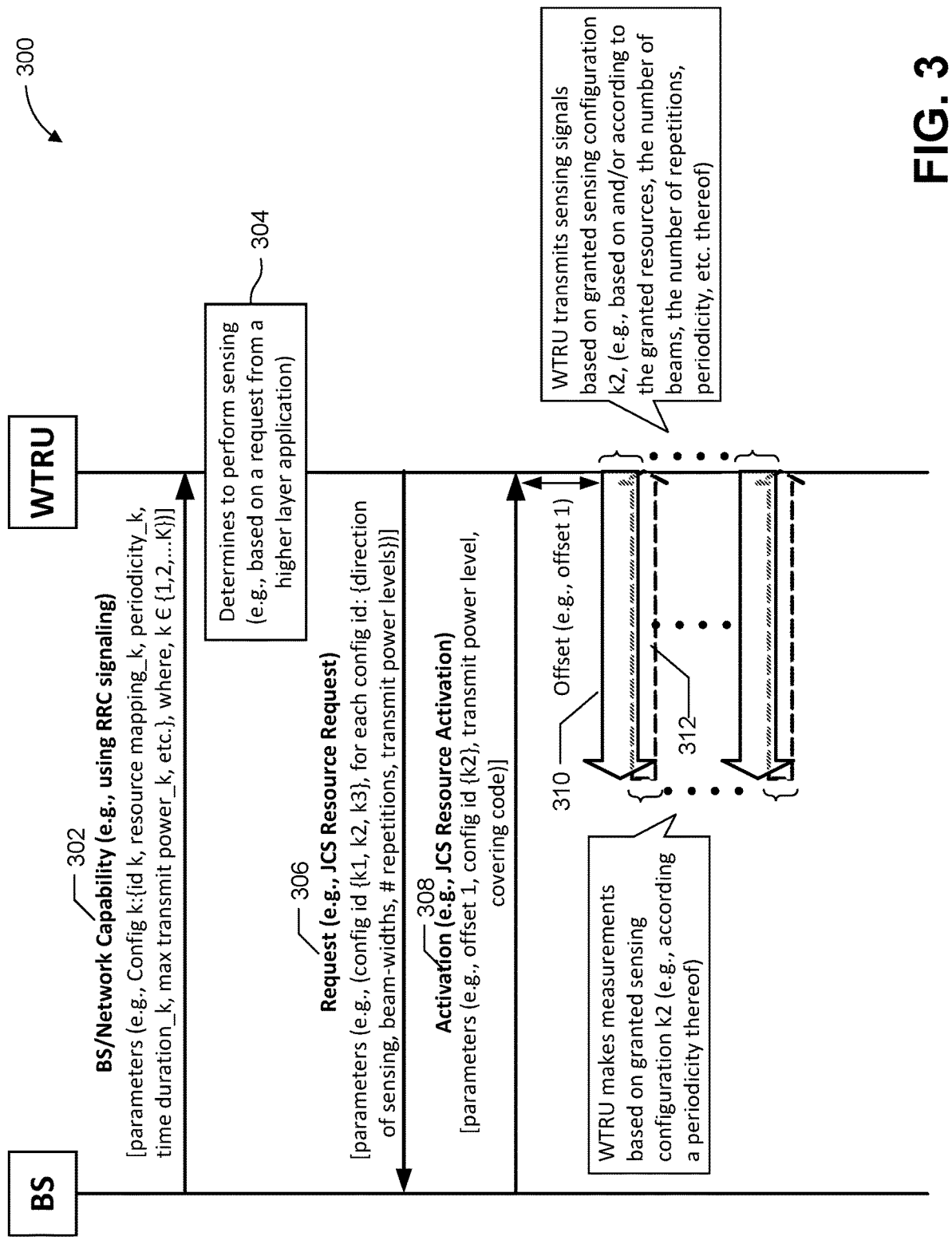
FIG. 3 shows an example procedure for performing WTRU-initiated active sensing using resources of a wireless communications system.

FIG. 3 shows an example procedure 300 for performing WTRU initiated active sensing using resources of a wireless communications systems. The procedure 300 may be suitable for performing WTRU initiated active sensing according to a sensing configuration autonomously selected from among a plurality of activated sensing configurations.

Referring to FIG. 3, a gNB may transmit configuration, capability or support information (302). The configuration, capability or support information may include one or more sensing configurations (e.g., a sensing configurations set). The configuration, capability or support information may be sent using RRC and/or other signaling. The WTRU may receive the configuration, capability or support information and provision itself with the sensing configurations.

After receiving a sensing request from a sensing application, the WTRU may determine to perform sensing (304). The WTRU may determine which one or more of the received sensing configurations allow for the requested sensing requirements to be fully or partially satisfied (each a "candidate sensing configuration"), and may compile a list including one or more of the candidate sensing configurations (each a "selected candidate sensing configuration"). Some of configurations, for example, may be able to satisfy the requesting sensing requirements fully whereas others may satisfy the requesting sensing requirements partially.

The WTRU may send an activation/reconfiguration request indicating the selected candidate sensing configurations (306). For example, the WTRU may send an activation/reconfiguration request that includes a list of sensing configuration IDs ("sensing configuration ID list") corresponding to the selected candidate sensing configurations. The activation/reconfiguration request may include other configuration/sensing parameters for one, some or all of the selected candidate sensing configurations. The other configuration/sensing parameters may include, for example, any of directionality, beam width and transmit power information.

The WTRU may receive from the gNB a configuration response Indicating one or more granted sensing configurations (308). For example, the WTRU may receive a configuration response that includes or indicates one or more of the sensing configuration IDs from the sensing configuration ID list. The configuration response may include one or more other configuration/sensing parameters for one, some or all of the granted sensing configurations. The other configuration/sensing parameters may include, for example, any of transmit power, covering code (e.g., in case if the gNB allocates the same resource for transmissions of multiple WTRUs), and offset information. The WTRU may perform sensing as previously described using one of the granted sensing configurations (310, 312). The WTRU may carry out the sensing in the same way as previously described but after a configured time offset following the reception of the configuration response. The WTRU may carry out reporting of the sensing measurements in the same ways as previously described.

WTRU initiated configuration switching may be carried out. Subsequent to receiving, determining, and/or using a sensing configuration (e.g., an active sensing configuration), the WTRU may determine to switch to another sensing configuration (e.g., a sensing configuration corresponding to a different resolution level). The WTRU may deactivate the measurements and/or the current sensing configuration(s) configured for the current resolution level(s) and may activate the measurements and/or sensing configuration(s) for a different resolution level(s) (e.g., higher or lower). The WTRU may determine to switch the resolution level, for example, based on any of the following:

- a request to switch to the resolution level received from the requesting application (e.g., when sensing is triggered/performed based on a request from an application of the WTRU);
- configuration timing from the gNB (e.g., when sensing is performed based on a request from the gNB);
- observed or estimated or measured interference on the backscatter channel;
- including, for example, any of:
  - interference estimation: the WTRU may be configured to observe or estimate or measure interference on the backscatter channel. One or more resources for interference measurement, e.g., time-frequency resource mapping along with other parameters such as periodicity, may be communicated to the WTRU. For example, the same set of frequency resources (e.g., REs or/and PRBs) used for sensing signal transmissions (e.g., JCS-RS transmissions) may be configured for interference measurements at the same or another time instance (e.g., different slot or symbol with respect to slot or symbol where WTRU transmission occurs). In another example, a different set of frequency resources with respect to the resources used for sensing signal transmissions (e.g., JCS-RS transmissions) may be configured for interference measurements. For each of the sensing signal transmissions (e.g., JCS-RS transmissions), either directional or omni-directional, one or more resources may be configured for interference measurement. The WTRU may use the total received power (e.g., without performing any transmission) over all the configured interference measurement resources (e.g., per sensing signal transmission) to estimate the interference. For example, in case of multiple configured interference measurement resources with respect to a sensing signal transmission, the WTRU may take average of the received power over the multiple configured resources, and may be over multiple sensing cycles, to derive the observed interference with respect to that transmission. The resource configuration for interference measurement may be communicated to the WTRU, e.g., as part of the higher layer signaling, in system information, or in a response message from the gNB, such as, for example, in a configuration response message, an activation message, etc.
  - on a condition that the WTRU observes interference on the backscatter channel of the current sensing measurements (e.g., in a sensing cycle, interference calculated over all the repetitions), exceeding a threshold. Different thresholds may be used to switch among the different resolution levels, for example, if the observed interference exceeds threshold t1, the WTRU may determine to switch from the current active resolution level to one level down. If the observed interference exceeds threshold t2 (where, for example, threshold t2>threshold t1), the WTRU may determine to switch from the current active resolution level to two levels down, and so on. For example, if the observed interference exceeds a maximum threshold, then the WTRU may determine to terminate the sensing. The value of the thresholds may be communicated to the WTRU, e.g., as part of the higher layer signaling, in system information, or in a response message from the gNB, such as, for example, in a configuration response message, an activation message, etc.
  on a condition that the WTRU observes interference on the backscatter channel of the current sensing measurements (e.g., in a sensing cycle, interference calculated over all the repetitions), below a threshold. Different thresholds may be used to switch among the different resolution levels, for example, if the observed interference is below threshold k1, the WTRU may determine to switch from the current active resolution level to one level up. If the observed interference is below threshold k2 (where, for example, threshold k1>threshold k2), the WTRU may determine to switch from the current active resolution level to two levels up, and so on. The value of the thresholds may be communicated to the WTRU, e.g., as part of the higher layer signaling, in system information, or in a response message from the gNB such as, for example, in a configuration response message, an activation message, etc.

The WTRU may send an activation/reconfiguration request (switching request) to the gNB, for example, based on a condition that the WTRU determines to switch the current resolution level or current sensing configuration. The activation/reconfiguration request may include and/or indicate any of: a sensing configuration ID of the current (e.g., and active) sensing configuration (for deactivation), a sensing configuration ID of the requested sensing configuration (for activation), etc.

In various embodiments, the activation/reconfiguration request may be sent as an UL MAC-CE. A new MAC-CE may be used for this purpose, for example, activation/deactivation request of sensing configuration. The MAC-CE may include one or more of: a sensing configuration ID of the current (e.g., and active) sensing configuration (for deactivation), a sensing configuration ID of the requested sensing configuration (for activation), etc. A separate field may be used for each sensing configuration ID. The number of bits used for each field may depend on the total number of different sensing configuration IDs (or different resolution levels configured for the sensing).

In various embodiments, a gNB may reserve UL resources (e.g., UL control channel or shared channel resources) for the activation/reconfiguration request (e.g., switch request). The UL resources for the activation/reconfiguration request transmission may be included in one or more SIBs. Alternatively, the UL resources may be included in the JCS response from the gNB that enables the sensing signal transmissions (e.g., configuration response message, an activation message, etc.). The WTRU may utilize the reserved UL resources to send a WTRU request. The WTRU request may at least include a specific sensing configuration ID, if multiple sensing configurations were previously configured by the gNB.

Multiple methods of WTRU request (e.g., for activation/reconfiguration requests, switching requests, etc.) may be configured. Specific rules may be configured for the WTRU to choose amongst multiple methods. For example, a WTRU request may follow a first method, e.g., slow switch, when changing the sensing configuration from a high-resolution sensing configuration to a low sensing resolution configuration. When changing from a low sensing resolution configuration to a high sensing resolution configuration, a second method, e.g., fast switch, may be utilized.

A rule may state that the fast switch mechanism may be used when (e.g., only when) the desired sensing resolution change is larger than a threshold. For example, if the desired sensing resolution is greater than the existing sensing resolution by a value that is smaller than P levels, then the slow switch mechanism should be used. However, if the desired sensing resolution level exceeds the existing sensing resolution level by a value greater than or equal to P levels, then the fast switch mechanism may be utilized.

Different resource configuration switching mechanisms may follow different signaling mechanisms. A fast switching request may utilize (e.g., require use of) reserved UL resources for transmitting an indication indicating a change in sensing configurations. A slow switching request may utilize a MAC-CE indication method.

The rules for utilizing the fast and slow switch mechanisms, and the associated thresholds may be specified in the JCS response from the gNB that enables the sensing signal transmissions (e.g., configuration response message, an activation message, etc.). Alternatively, rules for utilizing the fast and slow switch mechanisms, and the associated thresholds may be specified in one or more SIBs.

In various embodiments, the activation/reconfiguration request (switching request) may be sent, for example, as an uplink RRC message. A new RRC IE may be utilized for this purpose, for example, a SwitchingSensingResource IE. The new RRC IE may include any of: a sensing configuration ID of the current (e.g., and active) sensing configuration (for deactivation), a sensing-configuration ID of the requested sensing configuration (for activation), etc.

In various embodiments, when the WTRU determines to deactivate a current sensing configuration without activating another (e.g., a new) sensing configuration, the WTRU may send (e.g., may only send) a sensing configuration ID of the current (e.g., and active) sensing configuration (for deactivation). The field or other placeholder that might otherwise carry a sensing configuration ID of a requested sensing configuration (for activation) might be left unpopulated. In various embodiments, when the WTRU determines to activate another (e.g., a new) sensing configuration without deactivating any current sensing configuration, the WTRU may send (e.g., may only send) a sensing configuration ID of the requested sensing configuration (for activation). The field or other placeholder that might otherwise carry a sensing configuration ID of a current sensing configuration (for deactivation) might be left unpopulated.

After sending the activation/reconfiguration request (switching request), the other (e.g., new) sensing configuration (e.g., activating a sensing configuration for a new resolution level or/and deactivating the sensing configuration for a current resolution level) may be applied starting at a symbol, slot, sub-frame, etc. 'n1+L1', where 'n1' may be the symbol, slot, subframe, etc. in which the WTRU receives a downlink acknowledgement (e.g., HARQ-ACK or DCI 00/01 with NDI='1' for the HARQ process used of the activation/reconfiguration request (switching request) transmission) for the PUSCH transmission including the activation/reconfiguration request. Alternatively, the other (e.g., new) sensing configuration (e.g., activating the sensing configuration for a new resolution level or/and deactivating the sensing configuration for a current resolution level) may be applied starting at a symbol, slot, subframe, etc. 'n1+L1', where 'n1' may be the symbol, slot, subframe, etc. in which the WTRU transmits activation/reconfiguration request using uplink control channel. L1 is a time offset (e.g., number of symbols, slots, subframes or an absolute time value) and may be communicated to the WTRU. e.g., as a part of the configuration response, activation for sensing signal transmissions, higher layer signaling, in system information, etc.

Figure 4:
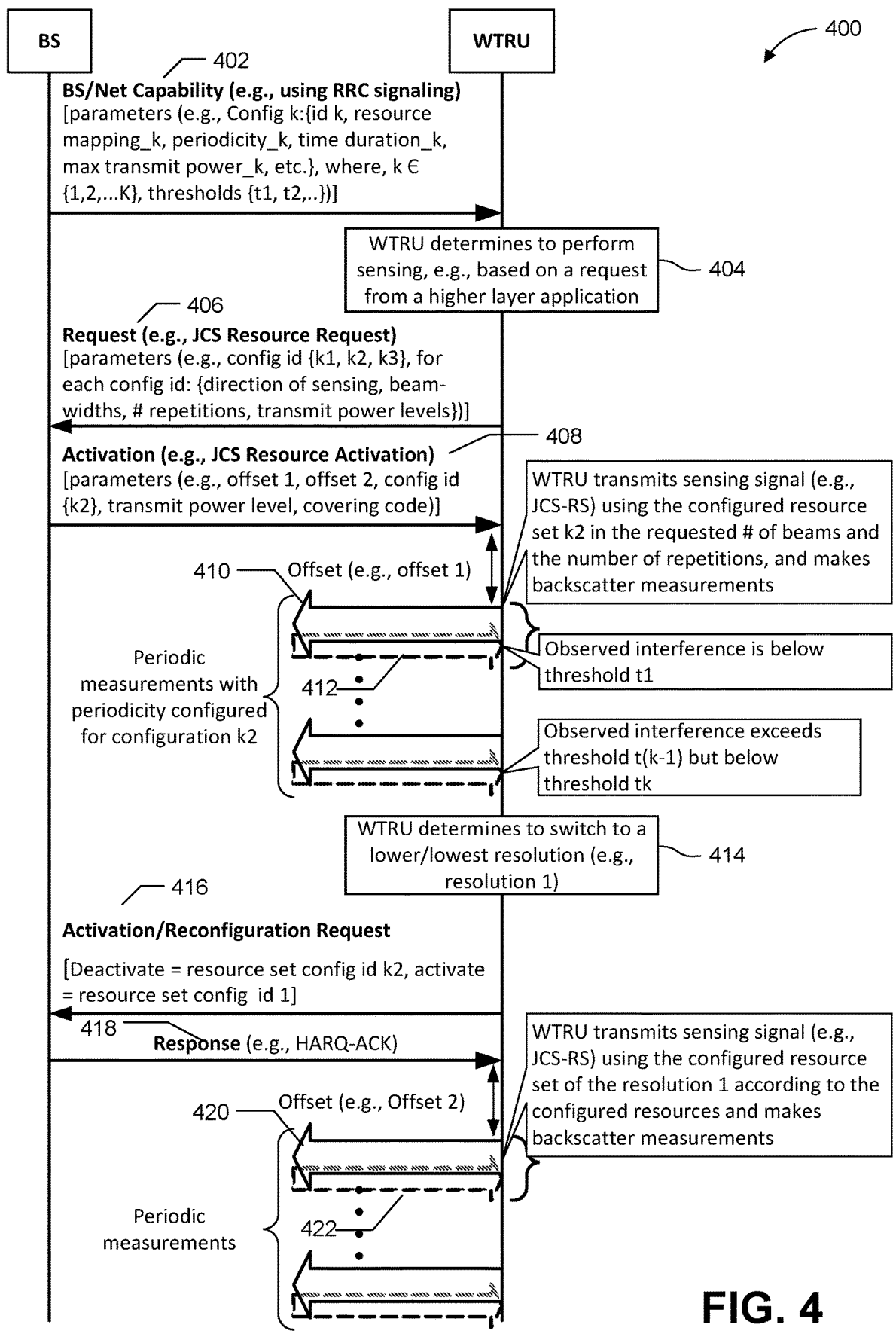
FIG. 4 shows an example procedure for performing WTRU-initiated active sensing using resources of a wireless communications system including configuration switching.

FIG. 4 shows an example procedure 400 for performing WTRU initiated active sensing using resources of a wireless communications system. The procedure 400 may be suitable for performing WTRU initiated active sensing according to different sensing configurations autonomously selected from among a plurality of activated sensing configurations, including configuration switching.

Referring to FIG. 4, the WTRU may be configured with gNB capability of different resource configurations to support signal sensing transmissions (e.g., for JCS-RS transmissions) along with a list of thresholds used to determine switching (402). After receiving a sensing request, the WTRU may determine to perform sensing (404). The WTRU may send an activation/reconfiguration request to activate one or more sensing configurations selected from the pre-configured gNB capability (406).

The WTRU may receive a configuration response from the gNB indicating and/or including one or more granted sensing configurations (408). The received configuration response may include a list of time offsets. The WTRU may use the time offsets to determine when to activate the allocated resources. The WTRU may transmit the sensing signals on the allocated resources in the activated/granted sensing configuration (410). The WTRU may make backscatter measurements (412). After observing an average interference (over all the beams/repetitions) in a sensing cycle exceeding threshold k−1 but below threshold k, the WTRU may determine to switch the sensing to the lowest resolution level (e.g., resolution 1) (414). The WTRU may send an activation/reconfiguration request (e.g., using an UL MAC-CE) to switch the current/requested sensing configurations (416). The WTRU may receive a downlink acknowledgement for the activation/reconfiguration request and may activate a granted sensing configuration (for resolution 1) (418). The WTRU may transmit the sensing signals on the allocated resources in the activated sensing configuration (420). The WTRU may make backscatter measurements (422).

WTRU-initiated, network directed sensing configuration switching may be carried out. A WTRU may send an activation/reconfiguration request to activate a sensing configuration not currently being used), and the resulting resource allocation or activation may be determined by the gNB. In various embodiments, the WTRU may be configured with multiple sensing configurations and/or sensing configuration sets by a base station (e.g., gNB) or other network element via the base station. The multiple sensing configurations and/or sensing configuration sets may support a single sensing resolution or multiple sensing resolutions. The sensing configurations and/or sensing configuration sets may be obtained from one or more SIBs and/or by higher layer (e.g., RRC) signaling. Alternatively, the sensing configurations and/or sensing configuration sets may be indicated and/or included in a response from the gNB, such as, for example, in a configuration response message, an activation message, etc.

When it is time to switch sensing configurations (e.g., for JCS), the WTRU may send an activation/reconfiguration request (e.g., resource configuration switch request) message to the gNB. The WTRU may specify the sensing resource configuration in the request. Alternatively, the WTRU may specify a sensing resolution (e.g., for which JCS resources are requested).

The WTRU may send the activation/reconfiguration request using a fast switch mechanism. For example, the WTRU may send the activation/reconfiguration request in dedicated resources that are configured by the gNB for this purpose. Alternately, the WTRU may send the activation/reconfiguration request using a slow switch mechanism. For example, the WTRU may send the activation/reconfiguration request in a MAC-CE.

The gNB may send a resource response (e.g., a resource configuration switch response) message in response to the activation/reconfiguration request (e.g., resource configuration switch request) message received from a WTRU. The resource response message from the gNB may include any of the following elements:
- a sensing configuration ID
- a number of sensing cycles or a time duration for which the sensing configuration remains valid once it is activated;
- a periodicity of sensing cycles;
- direction(s) of sensing (in case of multi-directional radar measurements);
- a beam width of each directional transmission (e.g., for multi-directional radar measurements);
- a number of repetitions or a number of repetitions in each direction;
- time-frequency resources, which may include any of:
  - a bandwidth span;
  - a density, which (i) may be in terms of a number of PRBs, (ii) may be over a given bandwidth, (iii) may include a number of REs per PRB, and/or (iv) may be indicated as one or more of a set (e.g., a fixed set) of patterns which may be known/communicated configured to the WTRU, e.g. using system information or higher layer signaling, etc., and
  - a starting symbol and/or a number of symbols (e.g., to be used for JCS-RS transmission), where the number of symbols may be equally distributed (e.g., sequentially) among the number of repetitions/directions;
- a covering code/sequence;
- a transmit power level (e.g., a maximum power per sensing cycle, a maximum power per direction, a maximum power per RE per direction, or a maximum power per PRB per direction);
- an activation delay-a delay after which the new sensing configuration becomes active (e.g., a number of frames or subframes following the frame having the resource response (e.g., a resource configuration switch response). Alternatively, the activation delay may indicate the number of frames or subframes following the frame including the acknowledgement (e.g., HARQ-ACK) corresponding to resource response (e.g., a resource configuration switch response).

Network initiated sensing configuration switching may be carried out. During an active sensing measurement cycle, for example, for a required resolution level, the WTRU may switch from making current sensing measurements to making new sensing measurements after receiving a request or command ("switching request/command"). For example, the WTRU may receive the switching request/command (e.g., an activation/reconfiguration request) from a gNB. The switching request/command may be, for example, a control message and/or configuration message. The switching request/command may include any of a sensing configuration ID of the current (e.g., an active) sensing configuration (for deactivation) and a sensing configuration ID of the granted sensing configuration (for activation). Pursuant to the switching request/command, the WTRU may deactivate the current sensing configuration and activate the granted sensing configuration. The granted sensing configuration may be for a different resolution level (e.g., higher or lower) than the current resolution level.

The gNB may determine to switch the sensing configuration for a WTRU, for example, in order to perform load balancing or traffic management, etc. The switch request/command may be received from the gNB, for example, as a downlink MAC-CE. A new downlink MAC-CE may be defined for this purpose, for example, an "Activation/Deactivation Network Request for JCS Resource Configuration". The MAC-CE may include any of: a sensing configuration ID of the current (e.g., and active) sensing configuration (for deactivation), a sensing configuration ID of the requested sensing configuration (for activation), etc. The sensing configuration IDs may be in separate fields. The number of bits used for each field may depend on the number of different sensing configuration IDs (or different resolution levels configured for the sensing).

After receiving the request/command from the gNB, the new sensing configuration (e.g., activating a sensing configuration for a new resolution level or/and deactivating a sensing configuration for a current resolution level) may be applied starting at a symbol, slot, subframe, etc. 'n2+L2', where 'n2' is the symbol, slot, subframe, etc. in which the WTRU sends an uplink acknowledgement (e.g., HARQ-ACK) for the MAC-CE including the switching request, and L2 is a time offset (e.g., a number of symbols, slots, subframes or an absolute time value). L2 may be communicated to the WTRU, e.g., as a part of higher layer signaling, in system information, or in the response message from the gNB, such as, for example, a configuration response or activation message, etc.

Alternatively, the WTRU may receive the switching request/command (e.g., an activation/reconfiguration request) from the gNB, for example, in a downlink control channel transmission or one or more DCIs. In various embodiments, separate DCIs may be used to deactivate an active sensing configuration (e.g., for sensing signal/JCS-RS transmissions) and to activate a new sensing configuration. For example, DCI 01 may be used. DCI 01 may be extended to include specific flags that may be used to enable identification and differentiation between activation and deactivation DCIs. Alternatively, DCI 01 may be extended such that specific values used in existing fields (e.g., HARQ process number, Redundancy version, etc.) may be used to enable the identification and differentiation between activation and deactivation DCIs.

In various embodiments, new DCI or DCIs may be implemented for this purpose. In various embodiments, a single DCI (DCI 01 or a new DCI) may include both the deactivation information (e.g., an ID of an active resource configuration) and the activation information (e.g., an ID of a new resource configuration). The WTRU may be configured with a new RNTI, e.g., JCS-RNTI, to descramble the DCI or DCIs that include the deactivation information (e.g., an ID of an active resource configuration) or/and activation information (e.g., an ID of a new resource configuration).

The WTRU may be configured to apply the new sensing configuration (e.g., activating a sensing configuration or sensing configuration set for a new resolution level or/and deactivating a sensing configuration or sensing configuration set for a current resolution level) starting at a symbol, slot, subframe, etc. 'n3+L3', where 'n3' is the symbol, slot, subframe, etc. in which the WTRU receives the DCI including the deactivation information (e.g., an ID of an active sensing configuration) or/and activation information (e.g., an ID of a new sensing configuration), and L3 is a time offset (e.g., a number of symbols, slots, subframes or an absolute time value). L3 may be communicated to the WTRU, e.g., in higher layer signaling, in system information, or as a part of the response message from the gNB, such as, for example, a configuration response or activation message, etc.

Figure 5:
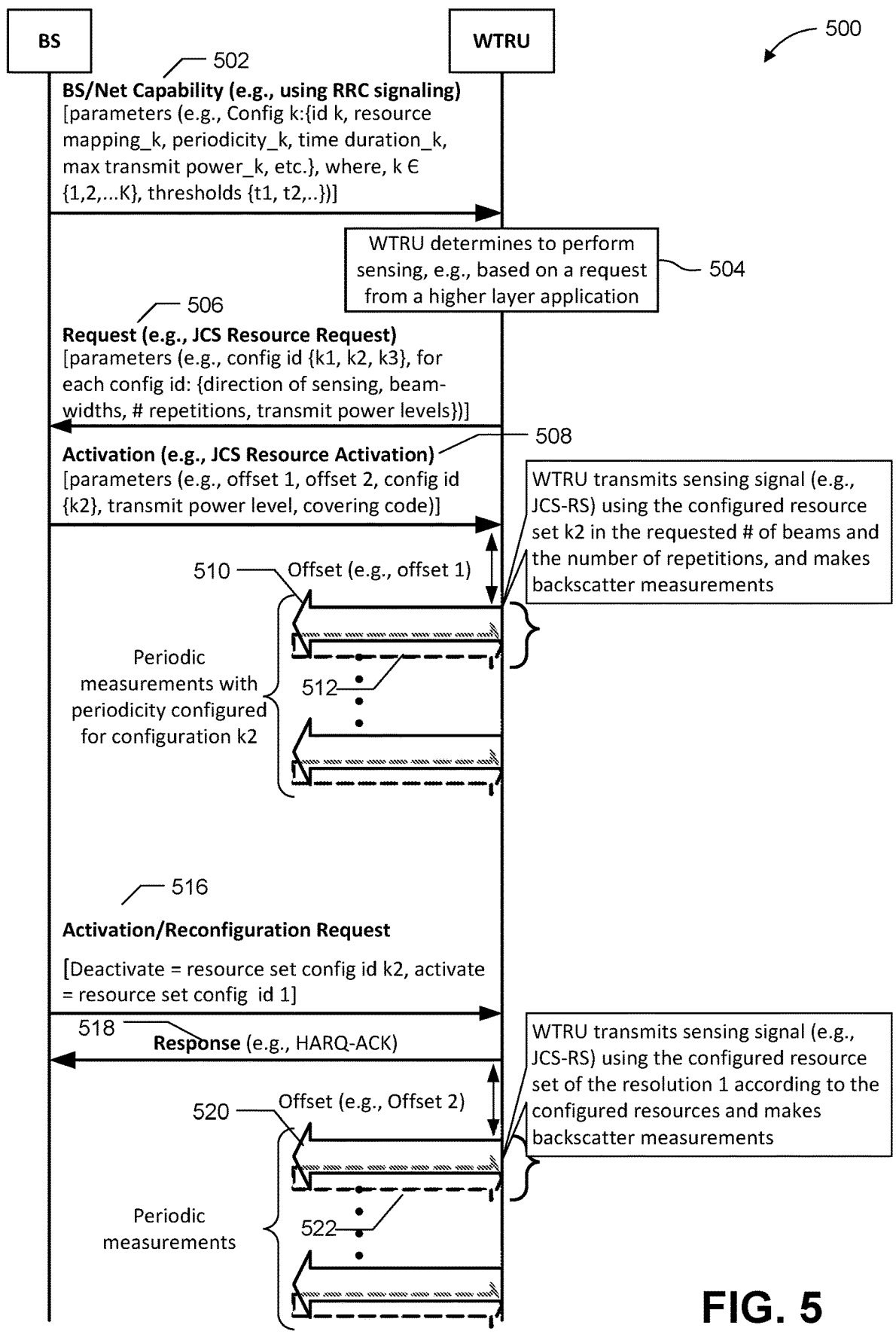
FIG. 5 shows an example procedure for performing WTRU initiated active sensing using resources of a wireless communications system, including network-initiated switching.

FIG. 5 shows an example procedure 500 for performing WTRU initiated active sensing using resources of a wireless communications system. The procedure 500 may be suitable for performing WTRU initiated active sensing according to different sensing configuration; a first autonomously selected from among a plurality of activated sensing configurations followed by a network-iniated change to a second of the plurality of activated sensing configurations.

Referring to FIG. 5, the WTRU may be configured with a gNB capability information defining different sensing configurations to support sensing signal transmissions (e.g., JCS-RS transmissions) (502). After receiving a sensing request (504), the WTRU may send an activation/reconfiguration request to activate one or more sensing configurations selected from the pre-configured gNB capability information (506). The WTRU may receive a configuration response from the gNB with one or more of the granted sensing configurations (508). The configuration response may include a list of time offsets. The WTRU may use the time offsets to determine when to activate the allocated resources. The WTRU may transmit sensing signals on the allocated resources in the activated/granted sensing configuration (510). The WTRU may make backscatter measurements (512).

After receiving a switching request/command (e.g., an activation/reconfiguration request, a downlink MAC-CE, etc.) from the gNB to switch the sensing configurations (516), the WTRU may activate sensing signal transmission using the new resource configuration (e.g., for resolution 1) and may deactivate the current sensing signal transmissions, e.g., for the resolution K.

Group sensing configuration change may be carried out. The WTRU may determine to switch the resolution level after receiving a request or command (e.g., sensing configuration change request) from the gNB, where the request may be received, for example, in a broadcast or in a multicast message from the gNB, e.g., cell-specific system information. The request may be received using RRC signaling. This may happen when the network (e.g., gNB) needs to change the sensing configuration of multiple WTRUs simultaneously.

The request or command may include, for example, a command to switch the current active sensing configuration (e.g., corresponding to a current active resolution level) to a new sensing configuration (e.g., corresponding to a different resolution level). Multiple bits may be used to indicate the switching. For example, if two bits are used, '00' may represent switching the current resolution level by two levels down, '01' may represent switching the current resolution level by one level down, '10' may represent switching the current resolution level by one level up, and '11' may represent switching the current resolution level by two levels up. More bits may be used to include the more switching commands.

In various embodiments, the request or command may include indications of the sensing configurations to be activated and/or deactivated (for example, to deactivate the current sensing configuration(s) and activate the new given resolution level). The indications may be, e.g., IDs attached to, linked to and/or associated with each sensing configuration. In various embodiments, the request or command may include and/or indicate a new sensing configuration (which needs to be activated and all other current sensing configurations need to be deactivated) along with information on the parameters, e.g., number of sensing cycles, directionality information, beam-width information, number of repetitions, periodicity of sensing cycle, transmit power, time/frequency resource information, covering code/sequence, transmit power, etc.

The request or command may be sent, for example, in one of the existing system information blocks (e.g., SIB1, SIB2, etc.). Alternatively, a new system information block may be defined for this purpose, and for which a new common search space or/and a common CORESET may be configured to the WTRU. A new RNTI may be configured to the WTRU to decode the common DCI including the information of the data channel carrying the system information of sensing configuration change. The configuration of new common search space, common CORESET, or/and, new RNTI may be communicated to the WTRU, e.g., as a part of the higher layer signaling or in another common system information block, etc.

The WTRU may be configured to apply the new sensing configuration starting at a symbol, slot, subframe, etc. 'n4+L4', where 'n4' is the symbol, slot, subframe, etc. in which the WTRU receives the PDSCH transmission including the system information having the sensing configuration change, and L4 is a time offset (e.g., a number of symbols, slots, subframes or an absolute time value). If the WTRU may need to send an UL acknowledgment (e.g., HARQ-ACK) for the PDSCH transmission including the system information having the sensing configuration change, the WTRU may be configured to apply the new sensing configuration starting at a symbol, slot, subframe, etc. 'n5+L5', where 'n5' is the symbol, slot, subframe, etc. in which the WTRU sends the uplink acknowledgment (e.g., HARQ-ACK), and L5 is a time offset (e.g., a number of symbols, slots, subframes or an absolute time value). The configuration of time offset (L4 or L5) may be communicated to the WTRU, e.g., as a part of the response message from the gNB, such as, for example, a configuration response or activation message or higher layer signaling or in the system information having the configuration change request or in another system information block, etc.

Network coordinated distribution of group sensor measurements may be carried out. A WTRU may perform at least one of the following actions to support JCS:
  transmit (e.g., to a gNB) a group JCS-RS measurement reporting request including the desired minimum reporting periodicity, WTRU position, etc.;
  receive a zone configuration for the cell including, for example, zone boundaries and/or a maximum zone update interval;
  receive a start time and/or periodicity of the group JCS measurement report transmission;
  receive a group-RNTI (G-RNTI) used to scramble a DCI in a PDCCH and/or the measurement report in a PDSCH;
  determine one or more sensor sharing zones (e.g., area for which additional measurements are sought from the gNB), e.g., based on at least one of the received zone configurations, a WTRU location and a (e.g., required) sensing range or region;
  send a sensor sharing zone list update to the gNB, for example, when a new sensor sharing zone or zone list is different from a previous zone or zone list or report;
  receive a new G-RNTI, for example, when a sensor sharing zone list update causes a grouping change;
  monitor a PDCCH for DCI scrambled using the G-RNTI.
The determination of the group for sensor sharing may be based on a WTRU position report and the (e.g., required) sensor sharing range or region.

Configuration and utilization of JCS resources for sensor sharing may be carried out. Sensor sharing may require a WTRU to identify its neighbors based on any of (i) sensing range requirements, which may be direction specific, (ii) a dynamic update of the neighbor group to support WTRU mobility, and (iii) mechanisms to efficiently transmit the combined sensor data from the identified neighbor group.

An application layer function at the WTRU may trigger sensor sharing with other WTRUs which may be coordinated by the gNB.

Alternatively, the WTRU may be configured to participate in sensor sharing with other WTRUs, for example by the gNB. The sensor sharing operation may include the WTRU carrying out any of the following: performing sensing (e.g., radar or RF sensing), measuring in one or more directions by transmitting RSs meant for backscatter measurements, transmitting the sensing results to the gNB, and receiving from the gNB sensing results from one or more other participating WTRUs.

Sensing may be used to mean measuring. Sensing and measuring may be substituted for each other in the examples and embodiments described herein.

WTRU initiated sensor sharing configuration may be carried out. A WTRU may initiate a sensor sharing session. A WTRU may carry out any of the following: send (e.g., to the gNB) a request for resources for transmitting sensing signals (e.g. JCS-RS resource request), send a request for resources to transmit the backscatter measurements to the gNB, and request the gNB to send to the WTRU backscatter measurements from other WTRUs that belong to that cell. The requests may be grouped together, e.g., contained within a new sensor sharing request message. Alternatively, the requests may be sent individually.

The WTRU may sense (e.g., measure) its surroundings periodically. The WTRU may include in its request (e.g., JCS-RS resource request) one or more of the requested measurement cycle periodicities, measurement start time and the number of repetition cycles in the requested measurement cycle/session. Alternatively, the WTRU may request, identify or specify a measurement cycle end time (e.g., instead of a number of repetitions). The start and end times may be specified in terms of a number of frames, subframes, etc. relative to a known reference, e.g., a frame, subframe, etc. in which the response corresponding to the JCS-RS resource request is received or when the JCS-RS resource request is successfully acknowledged (e.g., HARQ-ACK). The measurement cycle periodicity may be in terms of frames, subframes, etc.

The WTRU may request a sensing configuration, for example, for radar based sensing. The request may include or indicate at least one of: a number of frequency resources, a minimum bandwidth, and a minimum frequency density (e.g., of JCS-RS). The request may include or indicate a time domain resource configuration request, in terms of a number of symbols, subframes or frames. The time and frequency resources may be requested jointly in terms of PRBs, etc. The transmit power or alternatively, equivalent isotropically radiated power (EIRP), for each of these transmissions may be indicated or requested. The power may be in absolute terms such as in dBm, or relative to the current transmit power level allocated to the UE, e.g., in dBs.

The WTRU may request resources to perform multiple backscatter measurements in each measurement cycle. In various embodiments, a WTRU may perform multiple measurements using identical configurations for averaging. Alternatively, the WTRU may perform multiple measurements in a measurement cycle using different configurations, e.g., different directions or antenna configurations or beams. The WTRU may indicate, in the request message, an intended purpose of the repetition within a measurement cycle.

A WTRU may indicate measurement directions in the request message for performing multi-directional radar measurements in a measurement cycle. The indicated measurement directions may be and/or correspond to any of the following:
  absolute directions in terms of degrees, minutes, seconds with respect to a global reference, e.g., north;
  named directions such as north, south-east, etc.; and
  a relative direction with respect to a reference associated to, or selected by, the WTRU. For example, the relative direction may be the WTRU beam pointing direction used when communicating with the gNB. The relative direction may be specified in terms of angular units such as degrees, minutes, seconds, etc.

The WTRU may indicate, in the request, an antenna beam width that the WTRU may use for the backscatter measurements. The beam width may be specified in two orthogonal directions, with reference to the beam pointing direction. The beam width may be specified in angular units such as degrees, minutes, seconds, etc.

The gNB may send a resource response, e.g. JCS-RS resource response, in response to the WTRU resource request. The resource response may indicate and/or include a sensing configuration (e.g., determined by the gNB based on the WTRU request). The sensing configuration may be identical to that in the WTRU request or may differ from it. For example, the WTRU may have requested for a certain resource bandwidth and the sensing configuration indicated and/or included in the resource response may indicate a different, e.g., smaller, bandwidth. If the sensing configuration determined by the gNB response matches that in the WTRU request, then the resource response may indicate and/or include allocated resources for the WTRU to perform backscatter measurements. If the sensing configuration determined by the gNB response does not match that in the WTRU request, then the resource response may lack a grant for the WTRU to perform backscatter measurements.

If the resource response includes a sensing configuration different from that requested by the WTRU in the request message, then the WTRU may send a second resource request (e.g., JCS-RS resource request) with and/or indicating the modified configuration.

The WTRU may send a measurement reporting resource request (e.g., JCS-RS measurement reporting request) to the gNB. The measurement reporting resource request may be sent together with the JCS-RS resource request or separately.

The gNB may send a measurement reporting response (e.g., JCS-RS measurement reporting response) including the measurement reporting configuration. The measurement reporting configuration may be activated by a trigger transmitted by the WTRU when it is ready to perform JCS measurements and providing measurement results. The measurement reporting configuration may include a grant for the WTRU measurement reporting. The reporting configuration may include additional reporting configuration such as any of a minimum reporting periodicity and a minimum reporting resolution.

If the WTRU cannot satisfy the measurement reporting configuration requirements contained in the measurement reporting response from the gNB, then the WTRU may send another measurement reporting resource request including a different configuration.

The WTRU may send a sensing data sharing request message (e.g., JCS measurement sharing request) to the gNB to request sensing data sharing from the gNB. The request may include and/or indicate a configuration for reporting the sensing data ("data-sharing report configuration"). The requested data-sharing reporting configuration may include and/or indicate at least one of a reporting periodicity, a resolution for which sensing measurements are requested, and a specific direction or region of interest for which sensing measurements are requested. The direction of interest may be specified in terms of angular units with respect to a global frame of reference and/or a local frame of reference. This may be specified in terms of a pointing direction and an angular width around it and/or as extreme angular values in two orthogonal directions. The region of interest may be specified using coordinates of the endpoints.

After receiving the sensing data sharing request message (e.g. a JCS measurement sharing request), the gNB may respond with a sharing response message (e.g., a JCS measurement sharing response). The sharing response may include, e.g., a data-sharing report configuration of sensing data that the gNB has determined to supply to the WTRU. The data-sharing report configuration may include the reporting periodicity, a resolution for which sensing measurements will be reported, and supported directions or region of interest for which sensing measurements will be reported. The direction of interest may be specified in terms of angular units with respect to a global frame of reference and/or local frame of reference. The region of interest may be specified using the coordinates of the endpoints.

The sensing data sharing response message from the gNB may include the same data-sharing report configuration as requested by the WTRU in the sensing data sharing request message or the data-sharing report configuration may differ from that specified in the sensing data sharing request message. For example, the gNB may not be able to satisfy the resolution or periodicity indicated and/or included in the data-sharing report configuration requested by the WTRU. If the data-sharing report configuration indicated and/or included in the sensing data sharing response message differs from the requested data-sharing report configuration, then the WTRU may send another sensing data sharing request message with a different requested data-sharing report configuration.

gNB initiated sensing data sharing configuration may be carried out. A gNB may configure a WTRU capable of making backscatter measurements to perform specific measurements and report results of the measurements. The targeted WTRU may be configured for other backscatter measurements and for reporting results of such other measurements, and the gNB initiated sensing data configuration may result in additional measurements or modified parameters for existing measurements.

The gNB may request an attached WTRU to perform JCS measurements and send results of the measurement. The gNB may provide the corresponding configuration for performing backscatter measurements on sensing signals and a grant on which to send the measurement results to the gNB.

The WTRU may receive a request message (e.g., JCS-RS measurement configuration request) from the gNB signaling a start of the procedure. The request message may indicate and/or include the measurement configuration and a grant for resources on which the WTRU may transmit the sensing signals and perform backscatter measurements.

The measurement configuration may include any of a requested measurement cycle periodicity, a measurement start time and the number of repetition cycles in the requested session. Alternatively, the request message may include a measurement cycle end time, e.g., instead of number of repetitions. The start and end times may be specified in terms of the number of frames, subframes, etc. relative to a known reference, e.g., the frame or subframe in which the request is received or when it is successfully acknowledged. The measurement cycle periodicity may be specified in terms of frames, subframes, etc.

The measurement configuration may include the requested transmit power and/or EIRP, for each of the transmissions. The requested transmit power and/or EIRP may be specified in absolute terms such as in dBm, or relative to a current transmit power level allocated to the WTRU, e.g., in dB.

The measurement configuration may include the grant for transmitting the sensing signals and performing backscatter measurements. The measurement configuration may include a sensing configuration requested for radar-based sensing. The sensing configuration may include any of the number of frequency resources, the requested bandwidth and/or the frequency density. The sensing configuration may include a time domain resource configuration, which may be expressed in terms of a number of symbols, subframes and/or frames.

The WTRU may respond with a response message (e.g., JCS-RS measurement configuration response) to the gNB. The response message may include (i) an acknowledgement of the requested measurements and/or the requested measurement configuration, and/or (ii) a different configuration. The WTRU may send a configuration request, if, for example, the WTRU cannot satisfy the measurement periodicity of the measurement configuration requested by the gNB. If the measurement configuration indicated and/or include in the configuration request message sent by the WTRU differs from the measurement configuration requested by the gNB, then the gNB may send another measurement configuration request message with a different requested measurement configuration.

Measurement reporting may be carried out. A WTRU may transmit a measurement report, e.g., on the granted resources, when the report becomes available or when scheduled. The resource grant may be included in a message. e.g., an RRC configuration message. Alternatively, the measurement report may be sent whenever it is generated by the WTRU, by first sending an indication (e.g., a scheduling request (SR)) or by combining with other PUSCH data. The measurement report transmission may be scheduled using a control channel transmission, e.g., downlink control information (DCI). The measurement report may include any of the following:

received signal strength. The received signal strength may be represented as a set of measurements taken at multiple time instants, as configured in the measurement configuration. These measurements may be performed using a specified antenna configuration, e.g., the same receive antenna configuration or different antenna configurations for each measurement. The maximum time duration of the measurement or the number of iterations may correspond to the requirement for maximum measurement range. This is because multiple measurements using the same antenna configuration may be used to improve measurement range by post processing, e.g., averaging, to improve the signal-to-noise ratio.

amplitude or power of the first N peaks in the time series measurements. The value of N may be part of the measurement configuration received from the gNB.

amplitudes or powers of the first N peaks in descending order of amplitude, along with their corresponding time occurrences. The value of N may be part of the measurement configuration received from the gNB.

For each of the formats, the time and amplitude resolutions may be part of an initial measurement configuration received from the gNB.

The WTRU may include its location estimate (e.g., instantaneous location estimate) in the measurement report sent to the gNB. The WTRU may estimate its own position using on-board equipment such as a global navigation satellite system (GNSS) unit (e.g., for any of GPS, Galileo, Glonass, Beidou, etc.). Alternatively, the WTRU may first fetch its current location from a location server, which may estimate the current location from positioning measurements reported by the WTRU. In another alternative, the WTRU location may be fetched by the gNB directly from the location server in the network.

The WTRU measurement report may include the direction in which the backscatter measurement was taken. This reported direction may be specified in terms of angular units such as degrees, minutes, seconds, steradians, etc. The reported direction may be specified with respect to a global reference, such as a compass bearing. Alternately, the WTRU may specify the measurement direction in terms of named direction, such as North, South-West, etc. In another alternative, the WTRU may specify the measurement direction with respect to a local reference, such as its main beam pointing direction while communicating with the gNB.

The WTRU may include the beam width used while making the backscatter measurement included in the report. The beam width may be specified in terms of degrees, minutes, seconds, steradians, etc. The beam width may be specified as an angular displacement with respect to the main beam pointing direction, in one or more orthogonal directions. Alternatively, the beam width may be specified as a pair of minimum and maximum angular reading in one or more directions.

The WTRU may record a timestamp when each of the measurements is performed. The timestamp corresponding to each measurement may be included in the measurement report. Alternatively, if a series of measurements are performed with a fixed periodicity, then the measurement instants may be reported in any of the following methods:

start time, periodicity, number of occurrences or values, and start time, periodicity and end time.

Additionally, when a series of measurements are reported, then the measurement values may be reported in one or more of the following formats:

each measurement value is included at full available resolution, and a few, e.g. one, of the values is reported at full available resolution, and the remaining values in the series are reported relative to the value or values reported at full available resolution.

The timestamp may be internally derived value. When associated with a sensing signal measurement, the timestamp may correspond to the time when the first instance of the backscatter signal arrives at one of the layers of a protocol stack of the WTRU, e.g., PHY. Alternatively, timestamps for signal reception at other layers of the protocol stack may be reported, e.g., RLC, PDCP, etc. Alternatively, and/or additionally, the timestamp may be reported for other measurements as well, e.g., location, sensing signal measurement direction, etc.

Group measurement report distribution via unicast transmissions may be carried out. A WTRU may send a sensing data sharing request message (e.g., group JCS measurement reporting request) to the gNB. The sensing data sharing request may include a data-sharing report configuration sought by the WTRU. The data-sharing report configuration may include any of the following:

a reporting periodicity;
reporting duration;
a region for which the sensing measurements are to be reported ("sensing data sharing region");
an update format for an update to the sensing data sharing region ("sensing data sharing region update format"); and
a measurement resolution.

The WTRU may request periodic measurement reporting and may specify the corresponding reporting periodicity sought by it. The requested periodicity may be specified in terms of, e.g., number of frames, sub-frames, or time (such as seconds, milliseconds, etc.), etc.

The WTRU may specify the start and stop times for measurement reporting sought from the gNB. Alternatively, it may specify the start time and the number of periodic reports sought. The start and stop times may be specified in terms of the number of frames, subframes, etc. relative to a known reference, e.g., the frame or subframe in which the request is received or when it is successfully acknowledged.

The WTRU may indicate a specific area for which additional measurements are sought from the gNB. The specific area may include any of a specific region and an angular zone.

The WTRU may represent the region with respect to the coordinates encompassing it. Alternatively, the WTRU may specify a certain distance around it, i.e., a circle of specified radius with the WTRU at its center.

The angular region may be specified in terms of angles with respect to a global frame of reference and/or local frame of reference. Three-dimensional angular space, e.g., a cone, may be specified. For an angular region, the maximum range may be specified, e.g., angular region between a minimum angle and a maximum angle, relative to a local frame of reference and/or global frame of reference.

The WTRU may specify the nature of an update to sensing data sharing region, with respect to specific criteria, e.g., WTRU mobility. The WTRU may specify the sensing data sharing region as static, which may indicate that the WTRU is interested in receiving measurements for the specified region irrespective of its own mobility. Alternatively, the WTRU may designate the sensing data sharing region as dynamic, e.g., the sensing data sharing region follows the WTRU. For the dynamic, the gNB may need to know an instantaneous position of the WTRU when a measurement report is due. For example, if the WTRU specifies the region of interest as a circle of a certain radius around itself, then the gNB may adjust the position of the circle when the periodic measurement report is sent so that it is centered at the current WTRU location. The instantaneous position of the WTRU may be determined based on periodic positioning measurement reporting to a positioning server, or may be independently obtained from the WTRU itself, or the WTRU position estimate may be a part of the WTRU measurement report as well. Alternatively, the position of the WTRU may be fetched from the location server.

The WTRU may specify the measurement resolution sought as part of the sensing data sharing from the gNB. The WTRU may specify the minimum required amplitude and spatial resolution. The amplitude resolution may be specified in absolute terms, e.g., in dBm. Spatial resolution may be specified in units of length and may be specified for certain directions or dimensions. For example, the WTRU may specify that it requires a target designation with a spatial resolution of 2 meters in the South-East direction with an angular spread of 45 degrees around it. Alternatively, and/or additionally, the WTRU may specify a measurement staleness requirement. For example, the WTRU may seek radar sensing data for the specified region of interest from the gNB that is not more than 2 sec old.

The gNB may collect measurement reports from all reporting WTRUs in the cell to prepare a consolidated measurement report for the requesting WTRU. The gNB may perform filtering on the collected results. The criteria for filtering may be based on when the measurements were performed, the location of the WTRUs making the measurements, the direction in which the WTRUs performed the measurement, whether a measurement value exceeds a configured threshold, etc. One or more of these filtering criteria may have been previously specified by the requesting WTRU. The gNB may determine a time of the reported measurements from accompanying timestamps included in the measurement reports provided by the reporting WTRUs. Likewise, the gNB may determine the location and direction of measurement from the corresponding reported quantities.

Static grouping may be carried out. A WTRU may identify a relevant region of interest for sensing data sharing by determining its own location with respect to the layout of a cellular region. The WTRU may receive from the gNB a mapping of different potential WTRU locations within the cellular coverage area, e.g., zone boundaries, and corresponding zones. This information may be provided either as part of the periodic or on-demand SIB(s) or may be individually sent to the WTRU after it enters connected state or performs handover to the cell. Alternatively, the zone information may be sent on demand by the gNB, when requested by the WTRU.

The WTRU may determine the zone that it belongs to at any time by examining its current location and relating this information to the location-to-zone mapping provided by the gNB. The WTRU may determine its current location either from on-board positioning equipment, e.g. GNSS unit, or from information that may be supplied by the gNB, by querying the location server. Based on the knowledge of the zone that it belongs to, the WTRU can determine the neighboring zones that may fall within its region of interest for sensing data sharing. i.e., sensing data sharing region. The WTRU may infer (determine) the relation between the various zones, based on the information supplied by the gNB, or receive the neighborhood relation for each of these zones may from the gNB.

Figure 6:
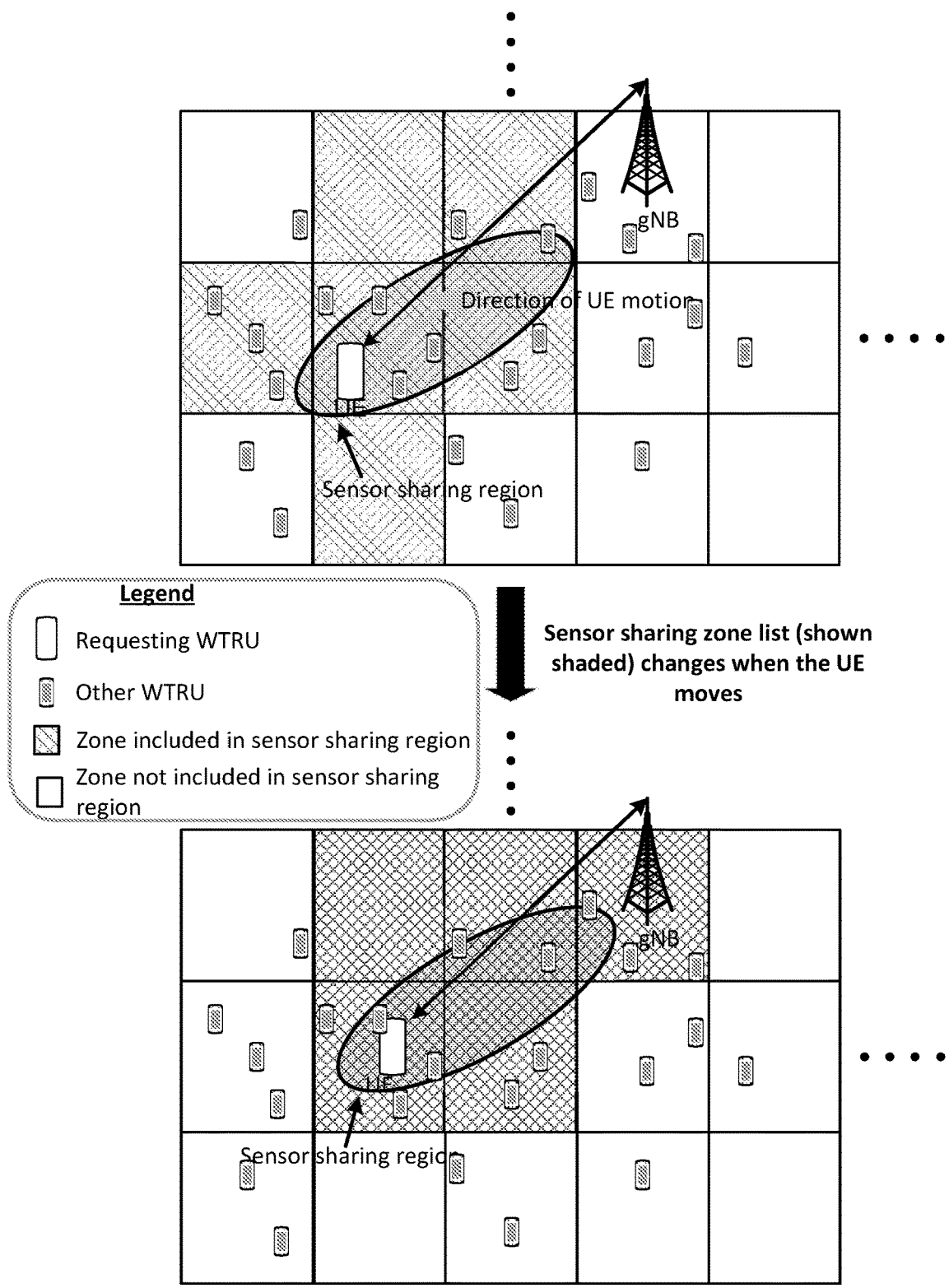
FIG. 6 illustrates sensor sharing region, zones and sensor sharing zone lists in connection with movement of an WTRU within a cell area.

FIG. 6 illustrates examples of sensing data sharing regions, zones, a sensing data sharing zone list, and changes thereto in connection with movement of the WTRU within a cell area.

The WTRU may be configured with a maximum zone update interval ($t_{max\_zone\_update}$), which denotes a periodicity at which the WTRU is expected to update the gNB with a sensing data sharing zone list; and with a report transmission periodicity ($t_{report\_period}$), which specifies a periodicity for gNB transmission of group JCS measurement reports. The WTRU may be configured with a G-RNTI by the gNB for receiving the group JCS measurement reports, if groupcast is enabled and multiple WTRUs have reported common sensing data sharing zone lists. The configuration of the maximum zone update interval, the report transmission periodicity, or/and the G-RNTI may be communicated to the WTRU from the gNB, for example, as a part of the JCS measurement sharing response, or as a part of the system information, or in RRC configuration, etc.

The WTRU may, as it moves over the cell area, determine the zones from which additional radar/sensing measurement data is needed, and inform the gNB accordingly. So, as the WTRU moves, the WTRU may determine that the composition of the sensing data sharing zone list has changed, e.g., one or more zones may have been added or deleted from the existing list. The WTRU may then send a message, e.g. sensing data sharing zone list update message, including the new list of zones that are relevant to it for sensing data sharing. Alternatively, the WTRU may send only the changes to the current list, e.g., the zones that have been added or deleted. The gNB may collect reported radar/sensing measurement results from the WTRUs within the identified zones and send the combined information to the requesting WTRU in the group JCS measurement report at the designated times. To receive the group JCS measurement report, the WTRU may monitor PDCCH transmissions for a DCI scrambled with its own C-RNTI or the G-RNTI, and then decode the measurement data in the PDSCH transmission based on a decoded DCI value.

Figure 7:
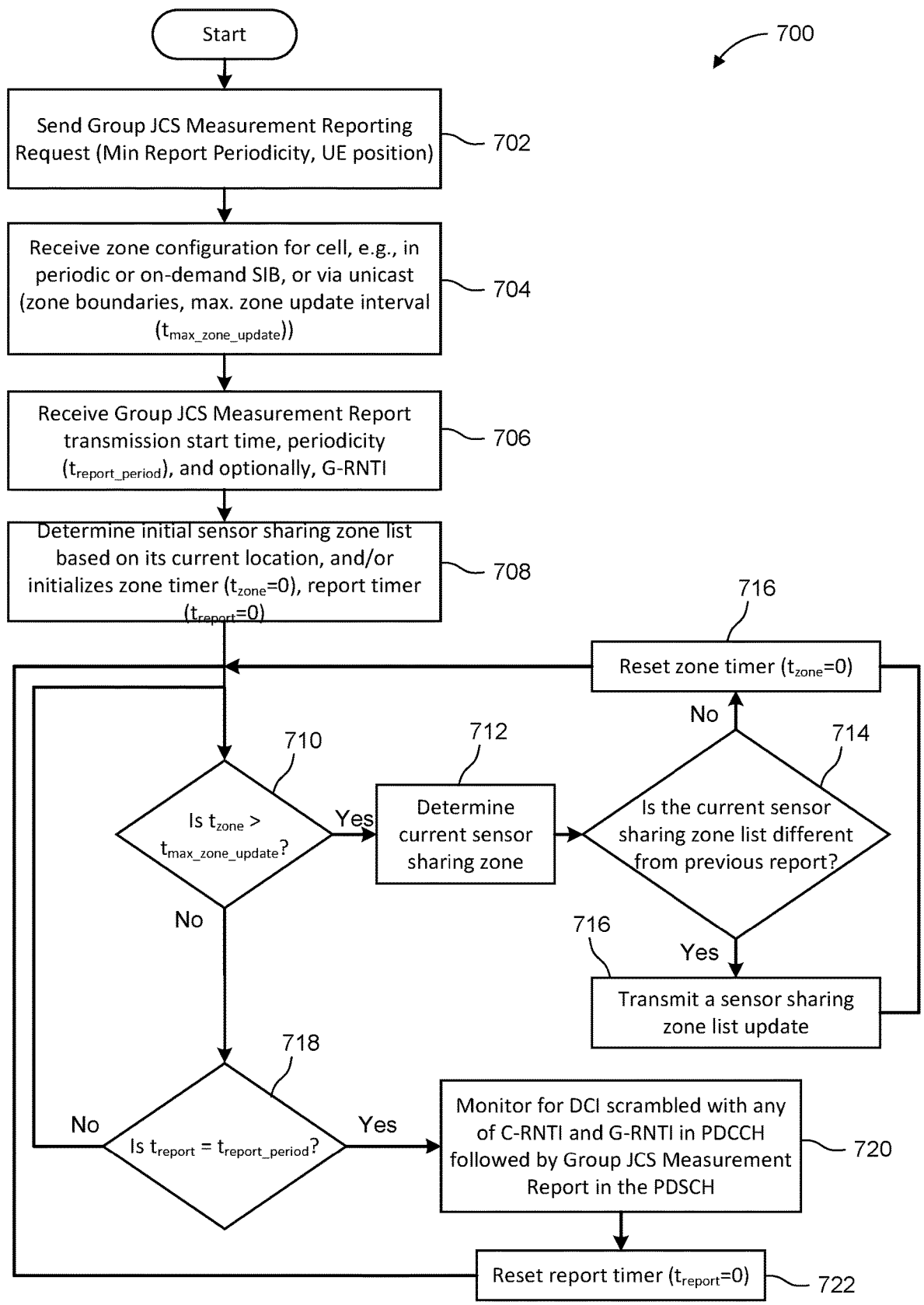
FIG. 7 illustrates an example procedure for zone-based measurement reporting.

FIG. 7 is a flow diagram illustrating a procedure for zone-based group measurement reporting 700. Referring to FIG. 7, a WTRU may send a group JCS measurement reporting request to a gNB (702). The measurement reporting request may include and/or indicate a minimum report periodicity and a position of the WTRU. The WTRU may receive a zone configuration for a cell corresponding to its position (704). The WTRU may receive the zone configuration, e.g., in periodic or on-demand SIB, or via unicast. The zone configuration may include one or more zone boundaries and a maximum zone update interval ($t_{max\_zone\_update}$).

The WTRU may receive a group measurement report transmission start time, a report transmission periodicity ($t_{report\_period}$), and/or a G-RNTI (706). The WTRU may determine an initial sensing-data sharing zone list based on its current location, may initialize a zone timer (e.g., set $t_{zone}=0$) and/or may initialize a report timer (e.g., set $t_{report}=0$) (708).

The WTRU may determine whether a current value of the zone timer exceeds maximum zone update interval (710). The WTRU may determine its current sensing data sharing zone on condition that the current value of the zone timer exceeds the maximum zone update interval (712). The WTRU may determine whether the current sensing data sharing zone list is different from a previously reported sensing data sharing zone list (714). The WTRU may reset the zone timer (e.g., set $t_{zone}=0$) (716) on condition that the current sensing data sharing zone list is not different from a previously reported sensing data sharing zone list. The WTRU may thereafter monitor the value of the zone timer and/or return to determining whether a current value of the zone timer exceeds maximum zone update interval (710)).

The WTRU may transmit a sensing data sharing zone list update on condition that the current sensing data sharing zone list is different from a previously reported sensing data sharing zone list (716). Thereafter, the WTRU may reset the zone timer (e.g., set $t_{zone}=0$) (716), monitor the value of the zone timer and/or return to determining whether a current value of the zone timer exceeds maximum zone update interval (710).

The WTRU may determine whether a current value of the report timer exceeds the report transmission periodicity timer on condition that the current value of the zone timer does not exceed a maximum zone update interval (718). On condition that the current value of the report timer does not exceed the report transmission periodicity timer, the WTRU may monitor the value of the zone timer and/or return to determining whether a current value of the zone timer exceeds maximum zone update interval (710). On condition that the current value of the report timer exceeds the report transmission periodicity timer, the WTRU may monitor for DCI scrambled with any of C-RNTI and G-RNTI in a PDCCH transmission followed by a group measurement report in a PDSCH transmission (720). Thereafter, the WTRU may reset the report timer (e.g., set $t_{report}=0$) (722), monitor the value of the zone timer and/or return to determining whether a current value of the zone timer exceeds maximum zone update interval (710).

Figure 8:
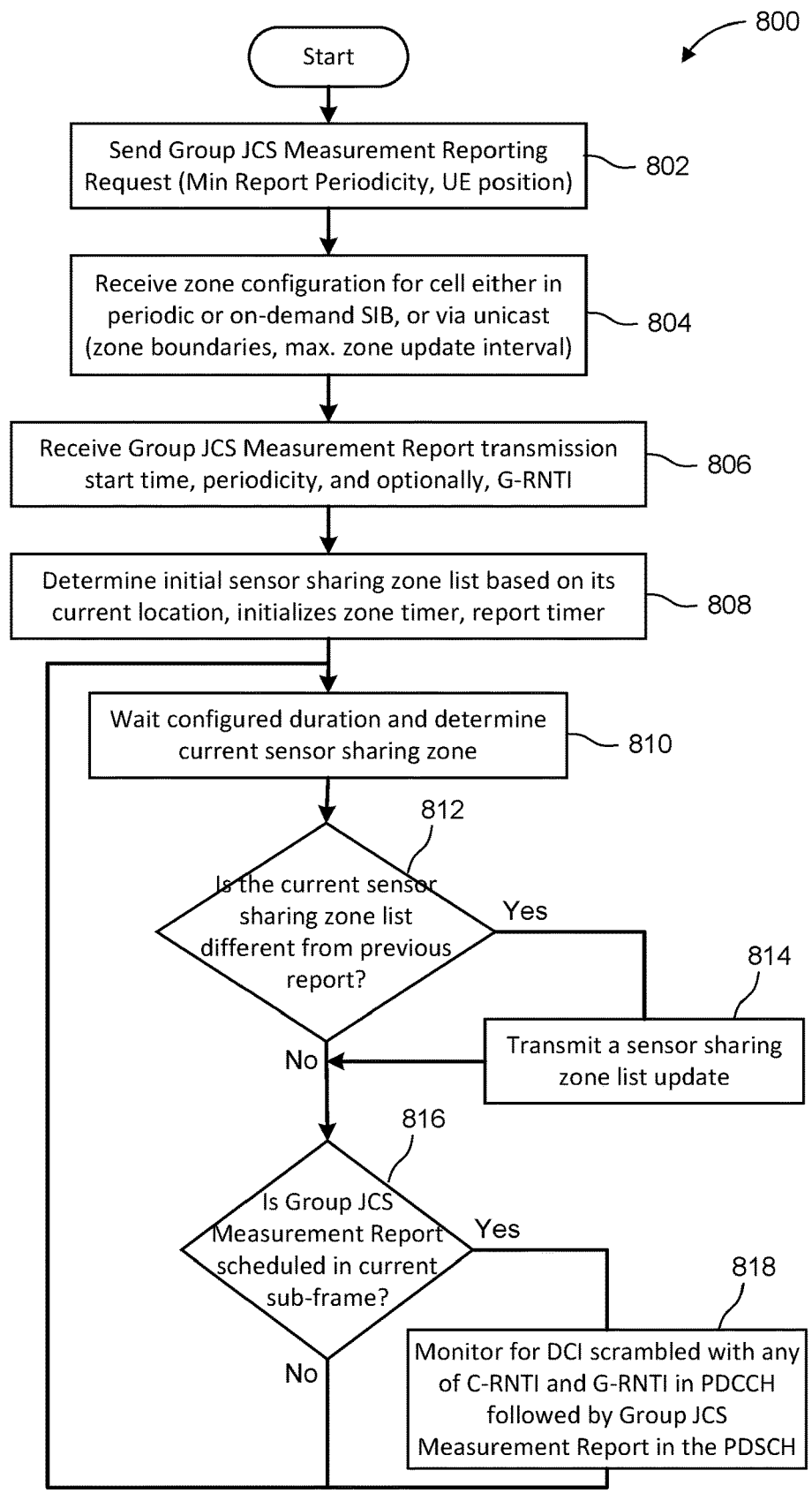
FIG. 8 illustrates an example procedure for zone-based measurement reporting.

FIG. 8 is a flow diagram illustrating a procedure for zone-based measurement reporting 800. procedure is shown in. The procedure 800 may be consider as a simplification (e.g., special case) of the procedure 700 of FIG. 7.

Referring to FIG. 8, a WTRU may send a group JCS measurement reporting request to a gNB (802). The measurement reporting request may include and/or indicate a minimum report periodicity and a position of the WTRU. The WTRU may receive a zone configuration for a cell corresponding to its position (804). The WTRU may receive the zone configuration, e.g., in periodic or on-demand SIB, or via unicast. The zone configuration may include one or more zone boundaries and a maximum zone update interval ($t_{max\_zone\_update}$).

The WTRU may receive a group measurement report transmission start time, a report transmission periodicity ($t_{report\_period}$), and/or a G-RNTI (806). The WTRU may determine an initial sensing-data sharing zone list based on its current location, may initialize a zone timer (e.g., set $t_{zone}=0$) and/or may initialize a report timer (e.g., set $t_{report}=0$) (808).

The WTRU may wait a configured duration and then determine its current sensing-data sharing zone (810). The WTRU may determine whether the current sensing data sharing zone list is different from a previously reported sensing data sharing zone list (812). The WTRU may determine whether a group measurement report is scheduled in a current subframe (816), e.g., on condition that the current sensing data sharing zone list is not different from a previously reported sensing data sharing zone list. The WTRU may monitor for DCI scrambled with any of C-RNTI and G-RNTI in a PDCCH transmission followed by a group measurement report in a PDSCH transmission (818). Thereafter, the WTRU may wait the configured duration and then determine its current sensing-data sharing zone (810).

The WTRU may transmit a sensing data sharing zone list update on condition that the current sensing data sharing zone list is different from a previously reported sensing data sharing zone list (814). The WTRU may determine whether a group measurement report is scheduled in a current subframe (816), The WTRU may monitor for DCI scrambled with any of C-RNTI and G-RNTI in a PDCCH transmission followed by a group measurement report in a PDSCH transmission (818). Thereafter, the WTRU may wait the configured duration and then determine its current sensing-data sharing zone (810).

Dynamic grouping may be carried out. The WTRU, as it moves around the cell area, periodically updates its location information with the gNB. The gNB may identify the group of neighboring WTRUs that fall within the region of interest of the requesting WTRU, e.g., for sensing data sharing. The WTRU may have previously communicated its region of interest for sensing data sharing, e.g., in terms of a range around it. This range or distance measure may be direction dependent. For example, the WTRU may be interested in obtaining radar measurements up to a farther distance along the direction that is currently heading and a shorter distance in other directions.

The gNB may specify a range resolution. For example, if the WTRU moves less than the specified amount, then the radar reporting WTRU group remains unchanged. When radar reporting WTRU group remains unchanged, the WTRU may refrain from reporting changes in position that are smaller in magnitude than the gNB specified value. The range resolution parameter may be communicated either as part of the system information or may be sent individually to the WTRU as higher layer configuration or as a part of the JCS measurement sharing response, etc.

WTRU requested grouping may be carried out and/or implemented. The WTRU may specify a certain region or direction in which it is interested in obtaining measurement results, e.g., radar measurement data from other WTRUs. This area may not include the WTRU (or not with respect to the WTRU's location). This may be the case, e.g., when the WTRU wants to supplement its own measurements in blind-spots, or if it requires higher precision data for certain regions.

FIG. 9 is a flow chart illustrating an example flow 900 for carrying out WTRU-initiated active sensing using resources of a wireless communications system according to various embodiments. The flow 900 and accompanying disclosures herein may be considered a generalization of the disclosures accompanying any of (i) the procedure 400 of FIG. 4, and (ii) a combination the procedures 200 and 300 of FIGS. 2 and 3, respectively. For convenience and simplicity of exposition, the flow 900 is described with reference to the architecture of the communications system 100 (FIG. 1). The flow 900 may be carried out using different architectures as well.

Referring to FIG. 9, a WTRU 102 may receive, from a network element of a wireless communications system, ("first") information indicating an activation of at least a first sensing configuration of a plurality of sensing configurations (902). Although the first information may indicate an activation of more than one of the plurality of sensing configurations, the description that follows assumes, for convenience and simplicity of exposition, the first information indicates an activation of one of the plurality of sensing configurations.

In various embodiments, the first information may include a first identifier of the first sensing configuration. In various embodiments, the first identifier may be, for example, a sensing configuration ID of the first sensing configuration. In various embodiments, the first sensing configuration may include information indicating one or more first time and frequency resources of the wireless communications system. In various embodiments, the first information may include and/or indicate a list of time offsets. The list of time offsets may include a first time offset associated with the first sensing configuration and/or a second time offset associated with a second of the plurality of sensing configurations. In various embodiments, the first configuration may define a sensing scheme for supporting a resolution level. In various embodiments, the first sensing configuration may indicate and/or include one or more sensing parameters (e.g., a sensing parameter set). The sensing parameters may include any of a number of sensing cycles, a time duration, a periodicity of sensing cycles, one or more directions of sensing, a beam width of a directional transmission, a number of repetitions, a bandwidth, a bandwidth span, a number of PRBs, a number of REs, a density in a frequency domain, and a transmit power. In various embodiments, the first information may indicate and/or include one or more transmit power levels and one or more covering codes (e.g., a transmit power level and a covering code for each of the first and second sensing configurations). In various embodiments, the WTRU 102 may receive the first information as part of higher layer signaling, in system information, or in a response message from the network element, such as, for example, in a configuration response message, an activation message, etc.

The WTRU may transmit a first sensing signal according to the first sensing configuration and using the first time and frequency resources (904). The first sensing signal may be a reference signal. The WTRU 102 may transmit the first sensing signal in the same ways as previously described. The WTRU 102, for example, may wait an amount of time before starting to transmit the first sensing signal. The amount of time may correspond to, and/or be based on, the first time offset. The first time offset may be referenced to a time of the reception of the first information (e.g., reception of the signaling, message(s), etc. carrying the first information).

The WTRU may perform one or more first measurements related to the first sensing signal (906). e.g. in the same ways as previously described. In various embodiments, the WTRU 102 may perform the first measurements at least in part by measuring a first power and round-trip time of a backscatter associated with the first sensing signal. The WTRU 102 may carry out reporting of the first sensing measurements (not shown) in the same ways as previously described.

The WTRU may transmit, to the network element. ("second") information indicating a change from the first sensing configuration to the second sensing configuration (908). In various embodiments, the second information may include a second identifier of the second sensing configuration. The second identifier may be, for example, a second sensing configuration ID. The second identifier may be included to indicate activation of the second sensing configuration. The second sensing configuration may include information indicating one or more time and frequency resources of the communications system 100. In various embodiments, the second sensing configuration may define a sensing scheme for supporting a resolution level. In various embodiments, the second sensing configuration may indicate and/or include one or more sensing parameters (e.g., a sensing parameter set). The sensing parameters may include any of a number of sensing cycles, a time duration, a periodicity of sensing cycles, one or more directions of sensing, a beam width of a directional transmission, a number of repetitions, a bandwidth, a bandwidth span, a number of PRBs, a number of REs, a density in a frequency domain, and a transmit power. In various embodiments, the second information may include the first identifier (e.g., the first sensing configuration ID). The first identifier may be included to indicate deactivation of the first sensing configuration.

In various embodiments, the WTRU 102 may trigger transmission of the second information based on an event. In various embodiments, the event may be when, or on a condition that, the WTRU determines to switch to a sensing configuration other than the current sensing configuration. The WTRU 102 may transmit the second information in a request message (e.g., activation/reconfiguration request message). The request message may be transmitted as any of a control message and a (re) configuration message.

The WTRU may receive, from the network element, ("third") information indicating an acknowledgment of the change from the first sensing configuration to the second sensing configuration (910). In various embodiments, the third information may include and/or indicate the second identifier. In various embodiments, the third information may include and/or indicate a list of time offsets (e.g., an updated list of time offsets). The list of time offsets may include a time offset associated with the second sensing configuration (and possibly, one for each of one or more other sensing configurations of the plurality of sensing configurations). In various embodiments, the third information may indicate and/or include one or more transmit power levels and one or more covering codes (e.g., a transmit power level and a covering code the second sensing configuration and for each of zero or more other sensing configurations of the plurality of sensing configurations). In various embodiments, the third information might not include and/or indicate the second identifier, a list of time offsets, transmit power levels and/or covering codes. The third information might not include and/or indicate the list of time offsets, transmit power levels, covering codes and/or portions thereof if already provided (e.g., in the first information).

The WTRU may transmit a second sensing signal according to the second sensing configuration and using the one or more second time and frequency resources (912). The second sensing signal may be a reference signal. The WTRU 102 may transmit the second sensing signal in the same ways as previously described. The WTRU 102, for example, may wait an amount of time before starting to transmit the first sensing signal. The amount of time may correspond to, and/or be based on, the second time offset. The second time offset may be referenced to a time of the reception of the third information (e.g., transmission of signaling, messages, etc. carrying the third information).

The WTRU may perform one or more second measurements related to the second sensing signal (914), e.g., in the same ways as previously described. In various embodiments, the WTRU 102 may perform the second measurements at least in part by measuring a second power and round-trip time of a backscatter associated with the second sensing signal. The WTRU 102 may carry out reporting of the second sensing measurements (not shown) in the same ways as previously described. In various embodiments, the WTRU 102 may carry out reporting of the first and second sensing measurements together.

In various embodiments, the WTRU 102 may be provisioned with (or indicated) the plurality of sensing configurations (e.g., a sensing configuration set). The WTRU 102 may receive information for provisioning the plurality of sensing configurations, and may provision itself with the plurality of sensing configurations based on the received information. The WTRU 102, for instance, may receive configuration, capability or support information from a gNB. The configuration, capability or support information may indicate and/or include one or more sensing configurations (e.g., a sensing configurations set). The configuration, capability or support information may be sent using RRC and/or other signaling. The WTRU may receive the configuration, capability or support information and provision itself with the sensing configurations. In various embodiments, the WTRU may be informed of the plurality of sensing configurations (e.g., a sensing configuration set) by way of signaling (e.g., system information).

In various embodiments, the WTRU 102 may be triggered to perform sensing based on an event. In various embodiments, the event may be any of a request from a higher layer application and a timing configuration. In various embodiments, the WTRU 102 may select one or more the sensing configurations responsive to being triggered to perform sensing. The WTRU may select the sensing configurations based on various sensing parameters (including, for example, resolution levels) of the provisioned sensing configurations.

In various embodiments, the WTRU 102 may transmit, to the network element, ("fourth") information indicating a request to activate one or more of the plurality of sensing configurations (e.g., the first sensing configuration, the second sensing configuration, both of the first and second sensing configurations, one or more sensing configurations other than the first and second sensing configurations, etc.). In various embodiments, the WTRU 102 may be triggered to transmit of the fourth information based on an event, and that event may be any of a request from a higher layer application and a timing configuration, for example.

In various embodiments, the fourth information may include and/or indicate values for sensing parameters corresponding to the selected sensing configurations. Examples of such sensing parameters may be, or may include, one of one or more sensing directions, one or more beam widths, a number of repetitions and a transmit power.

In various embodiments, at least one sensing configuration of the plurality of sensing configurations may be initially active or activated. In various embodiments, at least one sensing configuration of the plurality of sensing configurations may be initially active or activated when provisioned or when otherwise initially informed of the sensing configurations.

In various embodiments, the WTRU 102 may transmit, to the network element. ("fifth") information indicating a change from a current sensing configuration (e.g., the second sensing configuration) to a third sensing configuration of the plurality of sensing configurations. In various embodiments, the third sensing configuration may be any of the plurality of sensing configurations other than the current sensing configuration. In various embodiments, the fifth information may include a third identifier of the third sensing configuration. In various embodiments, the third identifier may be, for example, a sensing configuration ID of the third sensing configuration. The third configuration may include information indicating one or more third time and frequency resources of the wireless communications system. In various embodiments, the list of time offsets provided by the first (or third) information may include and/or indicate include a time offset associated with the third sensing configuration (and possibly, one for each of one or more other sensing configurations of the plurality of sensing configurations). In various embodiments, the transmit power levels and covering codes provided by the first (or third) information may indicate and/or include a transmit power level and a covering code for the third sensing configuration and for each of zero or more other sensing configurations of the plurality of sensing configurations.

In various embodiments, the WTRU 102 may transmit a third sensing signal according to the third sensing configuration and using the one or more third time and frequency resources. The third sensing signal may be a reference signal. The WTRU 102 may transmit the third sensing signal in the same ways as previously described. The WTRU 102, for example, may wait an amount of time before starting to transmit the third sensing signal. The amount of time may correspond to, and/or be based on the third time offset. The third time offset may be referenced to a time of the transmission of the fifth information (e.g., transmission of signaling, messages, etc. carrying the fifth information).

In various embodiments, the WTRU 102 may perform one or more third measurements related to the third sensing signal, e.g., in the same ways as previously described. In various embodiments, the WTRU 102 may perform the third measurements at least in part by measuring a third power and round-trip time of a backscatter associated with the third sensing signal. The WTRU 102 may carry out reporting of the third sensing measurements in the same ways as previously described.

In various embodiments, the fifth information may include a third identifier of the third sensing configuration and/or may include and/or indicate values for sensing parameters corresponding to the third sensing configurations. Examples of such sensing parameters may be, or may include, one of one or more sensing directions, one or more beam widths, a number of repetitions and a transmit power.

In various embodiments, the third sensing configuration may define a sensing scheme for supporting a resolution level. In various embodiments, the third sensing configuration may indicate and/or include any of a number of sensing cycles, a time duration, a periodicity of sensing cycles, one or more directions of sensing, a beam width of a directional transmission, a number of repetitions, a bandwidth, a bandwidth span, a number of PRBs, a number of REs, a density in a frequency domain, and a transmit power.

In various embodiments, the WTRU 102 may be triggered to perform sensing according to the third configuration based on an event. In various embodiments, that event may be any of a request from a higher layer application and a timing configuration. In various embodiments, the WTRU 102 may select the third or other sensing configurations responsive to being triggered to perform sensing. The WTRU may select the sensing configurations based on various sensing parameters (including, for example, resolution levels).

In various embodiments, the WTRU 102 may receive, from the network element, ("sixth") information indicating an acknowledgement of the fifth information. In various embodiments, the sixth information may be transmitted as, or included in, any of a control message and a response message.

In various embodiments, the WTRU 102 may receive, from the network element, ("seventh") information indicating to change to a fourth sensing configuration of the plurality of sensing configurations. The fourth sensing configuration may include information indicating one or more fourth time and frequency resources of the wireless communications system. In various embodiments, the fourth sensing configuration may be any of the plurality of sensing configurations other than the current sensing configuration. In various embodiments, the seventh information may include a fourth identifier of the fourth sensing configuration. In various embodiments, the fourth identifier may be, for example, a sensing configuration ID of the fourth sensing configuration. The fourth identifier may be included to indicate activation of the fourth sensing configuration. In various embodiments, the seventh information may include and/or indicate a list of time offsets (e.g., an updated list of time offsets). The list of time offsets may include a time offset associated with the fourth sensing configuration (and possibly, one for each of one or more other of the plurality of sensing configurations). In various embodiments, the seventh information may indicate and/or include one or more transmit power levels and one or more covering codes (e.g., a transmit power level and a covering code for the fourth sensing configuration and for each of zero or more other sensing configurations of the plurality of sensing configurations). The seventh information might not include and/or indicate the list of time offsets, transmit power levels, covering codes and/or portions thereof if already provided (e.g., in the first and/or third information). In various embodiments, the seventh information may (or might not) include and/or indicate values for sensing parameters of the fourth sensing configuration. In various embodiments, the seventh information may include an identifier of the current sensing configuration. The identifier of the current sensing configuration may be included to indicate deactivation of the current sensing configuration.

In various embodiments, the WTRU 102 may transmit a fourth sensing signal according to the fourth sensing configuration and using the one or more fourth time and frequency resources. The fourth sensing signal may be a reference signal. The WTRU 102 may transmit the fourth sensing signal in the same ways as previously described. The WTRU 102, for example, may wait an amount of time before starting to transmit the fourth sensing signal. The amount of time may correspond to, and/or be based on, the fourth time offset. The fourth time offset may be referenced to a time of the reception of the tenth information (e.g., transmission of signaling, messages, etc. carrying the tenth information).

In various embodiments, the WTRU may perform one or more fourth measurements related to the transmitted fourth sensing signal, e.g., in the same ways as previously described. In various embodiments, the WTRU 102 may perform the fourth measurements at least in part by measuring a fourth power and round-trip time of a backscatter associated with the fourth sensing signal. The WTRU 102 may carry out reporting of the forth sensing measurements (not shown) in the same ways as previously described.

In various embodiments, the fourth sensing configuration may define a sensing scheme for supporting a resolution level. In various embodiments, the fourth sensing configuration may indicate and/or include one or more sensing parameters (e.g., a sensing parameter set). The sensing parameters may include any of a number of sensing cycles, a time duration, a periodicity of sensing cycles, one or more directions of sensing, a beam width of a directional transmission, a number of repetitions, a bandwidth, a bandwidth span, a number of PRBs, a number of REs, a density in a frequency domain, and a transmit power.

In various embodiments, the WTRU 102 may be triggered to perform sensing according to the fourth configuration based on an event. In various embodiments, that event may be any of a request from a higher layer application and a timing configuration. In various embodiments, the WTRU 102 may select the fourth or other sensing configurations responsive to being triggered to perform sensing. The WTRU may select the sensing configurations based on various sensing parameters (including, for example, resolution levels).

In various embodiments, the WTRU 102 may transmit, to the network element, eighth information indicating an acknowledgement of the seventh information. In various embodiments, the eighth information may be transmitted as, or included in, any of a control message and a response message.

FIG. 10 is a flow chart illustrating an example flow 1000 for carrying out WTRU-initiated active sensing using resources of a wireless communications system according to various embodiments. The flow 1000 and accompanying disclosures herein may be considered a generalization of the disclosures accompanying the procedure 500 of FIG. 5. For convenience and simplicity of exposition, the flow 1000 is described with reference to the architecture of the communications system 100 (FIG. 1). The flow 1000 may be carried out using different architectures as well.

The flow 1000 and accompanying disclosures herein are similar to the flow 900 of FIG. 9) and accompanying disclosures, except that the network may initiate the switch from the first sensing configuration to second sensing configuration. For example, referring to FIG. 1000, the WTRU 102 may receive, from the network element, ("second") information indicating to change from the first sensing configuration to the second sensing configuration (1008). The WTRU 102 may receive the second information in a request (e.g., activation/reconfiguration request). The activation/reconfiguration request may be received in and/or as any of a control message and a (re) configuration message. The activation/reconfiguration request may indicate and/or include any of the second sensing configuration, a (e.g., a requested) resolution level, etc. Further, instead of receiving an acknowledgement of the second information from the network element, the WTRU 102 may transmit, to the network element, ("third") information indicating an acknowledgement of the second information. In various embodiments, the second information may be transmitted as, or included in, any of a control message and a response message.

FIG. 11 is a flow chart illustrating an example flow 1100 for carrying out WTRU-initiated active sensing using resources of a wireless communications system according to various embodiments. The flow 1100 and accompanying disclosures herein may be considered a generalization of the disclosures accompanying any of (i) the procedure 400 of FIG. 4, and (ii) a combination the procedures 200 and 300 of FIGS. 2 and 3, respectively. For convenience and simplicity of exposition, the flow 1100 is described with reference to the architecture of the communications system 100 (FIG. 1). The flow 1100 may be carried out using different architectures as well.

Referring to FIG. 11, a WTRU 102 may receive, from a network element of the communications system 100, ("first") information indicating an activation of at least first and second sensing configurations of a plurality of sensing configurations (1102). The first and second sensing configurations may include respective information indicating one or more time and frequency resources of the communications system 100. In various embodiments, the first information may include first and second identifiers of the first and second sensing configurations, respectively. The first and second identifiers may be, for example, first and second sensing configuration IDs, respectively. In various embodiments, the first information may include and/or indicate a list of time offsets. The list of time offsets may include a first time offset associated with the first sensing configuration and/or a second time offset associated with the second sensing configuration. In various embodiments, each of the first and second sensing configurations may define a sensing scheme for supporting a resolution level. In various embodiments, each of the first and second sensing configurations may indicate and/or include one or more sensing parameters (e.g., a sensing parameter set). The sensing parameters may include any of a number of sensing cycles, a time duration, a periodicity of sensing cycles, one or more directions of sensing, a beam width of a directional transmission, a number of repetitions, a bandwidth, a bandwidth span, a number of PRBs, a number of REs, a density in a frequency domain, and a transmit power. In various embodiments, the first information may indicate and/or include one or more transmit power levels and one or more covering codes (e.g., a transmit power level and a covering code for each of the first and second sensing configurations). In various embodiments, the WTRU 102 may receive the first information as part of higher layer signaling, in system information, or in a response message from the network element, such as, for example, in a configuration response message, an activation message, etc.

The WTRU 102 may transmit a first sensing signal according to the first sensing configuration and using the one or more first time and frequency resources (1104). The first sensing signal may be a reference signal. The WTRU 102 may transmit the first sensing signal in the same ways as previously described The WTRU 102, for example, may wait an amount of time before starting to transmit the first sensing signal. The amount of time may correspond to, and/or be based on, the first time offset. The first time offset may be referenced to a time of the reception of the first information (e.g., reception of the signaling, messages, etc. carrying the first information).

The WTRU 102 may perform one or more first measurements related to the first sensing signal (1106), e.g. in the same ways as previously described. In various embodiments, the WTRU 102 may perform the first measurements at least in part by measuring a first power and round-trip time of a backscatter associated with the first sensing signal. The WTRU 102 may carry out reporting of the first sensing measurements (not shown) in the same ways as previously described.

The WTRU 102 may transmit, to the network element, ("second") information indicating a change from the first sensing configuration to the second sensing configuration (1108). The second information may indicate and/or include any of the second sensing configuration, a (e.g., a requested) resolution level, etc. In various embodiments, the second information may include the first identifier and the second identifier. The first identifier may be included to indicate deactivation of the first sensing configuration and the second identifier may be included to indicate activation of the second sensing configuration.

In various embodiments, the WTRU 102 may trigger transmission of the second information based on an event. In various embodiments, the event may be when, or on a condition that, the WTRU determines to switch to a sensing configuration other than the current sensing configuration. The WTRU 102 may transmit the second information in a request message (e.g., activation/reconfiguration request message). The activation/reconfiguration request message may be transmitted as any of a control message and a (re) configuration message.

The WTRU 102 may transmit a second sensing signal according to the second sensing configuration and using the one or more second time and frequency resources (1112). The second sensing signal may be a reference signal. The WTRU 102 may transmit the second sensing signal in the same ways as previously described. The WTRU 102, for example, may wait an amount of time before starting to transmit the second sensing signal. The amount of time may correspond to, and/or be based on, the second time offset. The second time offset may be referenced to a time of the transmission of the second information (e.g., transmission of signaling, messages, etc. carrying the second information).

The WTRU 102 may perform one or more second measurements related to the second sensing signal (1114), e.g., in the same ways as previously described. In various embodiments, the WTRU 102 may perform the second measurements at least in part by measuring a second power and round-trip time of a backscatter associated with the second sensing signal. The WTRU 102 may carry out reporting of the second sensing measurements (not shown) in the same ways as previously described. In various embodiments, the WTRU 102 may carry out reporting of the first and second sensing measurements together.

In various embodiments, the WTRU may be provisioned with (or indicated) the plurality of sensing configurations (e.g., a sensing configuration set). The WTRU 102 may receive information for provisioning the plurality of sensing configurations, and may provision itself with the plurality of sensing configurations based on the received information. The WTRU, for instance, may receive configuration, capability or support information from a gNB. The configuration, capability or support information may indicate and/or include one or more sensing configurations (e.g., a sensing configurations set). The configuration, capability or support information may be sent using RRC and/or other signaling. The WTRU may receive the configuration, capability or support information and provision itself with the sensing configurations. In various embodiments, the WTRU may be informed of the plurality of sensing configurations (e.g., a sensing configuration set) by way of signaling (e.g., system information).

In various embodiments, the WTRU 102 may be triggered to perform sensing based on an event. In various embodiments, the event may be any of a request from a higher layer application and a timing configuration. In various embodiments, the WTRU 102 may select one or more the sensing configurations responsive to being triggered to perform sensing. The WTRU may select the sensing configurations based on various sensing parameters (including, for example, resolution levels) of the provisioned sensing configurations.

In various embodiments, the WTRU may transmit, to the network element, ("third") information indicating a request to activate one or more of the plurality of sensing configurations (e.g., the first sensing configuration, the second sensing configuration, both of the first and second sensing configurations, one or more sensing configurations other than the first and second sensing configurations, etc.). In various embodiments, the WTRU 102 may be triggered to transmit of the third information based on an event, and that event may be any of a request from a higher layer application and a timing configuration, for example.

In various embodiments, the third information may include and/or indicate values for sensing parameters corresponding to the selected sensing configurations. Examples of such sensing parameters may be, or may include, one of one or more sensing directions, one or more beam widths, a number of repetitions and a transmit power.

In various embodiments, at least one sensing configuration of the plurality of sensing configurations may be initially active or activated. In various embodiments, at least one sensing configuration of the plurality of sensing configurations may be initially active or activated when provisioned or when otherwise initially informed of the sensing configurations.

In various embodiments, the WTRU 102 may receive, from the network element, ("fourth") information indicating an acknowledgement of the third information indicating the change from the first sensing configuration to the second sensing configuration.

In various embodiments, the WTRU 102 may transmit, to the network element, ("fifth") information indicating a request to a change from a current sensing configuration (e.g., the second sensing configuration) to a third sensing configuration of the plurality of sensing configurations. In various embodiments, the third sensing configuration may be any of the plurality of sensing configurations other than the current sensing configuration.

In various embodiments, the WTRU 102 may receive, from the network element, ("sixth") information indicating the activation of the third sensing configuration. In various embodiments, the sixth information may include a third identifier of the third sensing configuration. In various embodiments, the third identifier may be, for example, a sensing configuration ID of the third sensing configuration. The third identifier may be included to indicate activation of the third sensing configuration. The third configuration may include information indicating one or more third time and frequency resources of the wireless communications system. In various embodiments, the sixth information may include and/or indicate a list of time offsets (e.g., an updated list of time offsets). The list of time offsets may include a time offset associated with the third sensing configuration (and possibly, one for each of one or more other of the plurality of sensing configurations). In various embodiments, the sixth information may indicate and/or include one or more transmit power levels and one or more covering codes (e.g., a transmit power level and a covering code for the third sensing configuration and for each of zero or more other sensing configurations of the plurality of sensing configurations). The sixth information might not include and/or indicate the list of time offsets, transmit power levels, covering codes and/or portions thereof if already provided (e.g., in the first and/or third information). In various embodiments, the sixth information may include an identifier of the current sensing configuration. The identifier of the current sensing configuration may be included to indicate deactivation of the current sensing configuration.

In various embodiments, the WTRU 102 may transmit a third sensing signal according to the third sensing configuration and using the one or more third time and frequency resources. The third sensing signal may be a reference signal. The WTRU 102 may transmit the third sensing signal in the same ways as previously described The WTRU 102, for example, may wait an amount of time before starting to transmit the third sensing signal. The amount of time may correspond to, and/or be based on, the third time offset. The third time offset may be referenced to a time of the transmission of the fifth information or the reception of the sixth information (e.g., transmission of signaling, messages, etc.

carrying the fifth information or reception of signaling, messages, etc. carrying the sixth information).

In various embodiments, the WTRU 102 may perform one or more third measurements related to the third sensing signal, e.g., in the same ways as previously described. In various embodiments, the WTRU 102 may perform the third measurements at least in part by measuring a third power and round-trip time of a backscatter associated with the third sensing signal. The WTRU 102 may carry out reporting of the third sensing measurements in the same ways as previously described.

In various embodiments, the fifth information may include a third identifier of the third sensing configuration and/or may include and/or indicate values for sensing parameters corresponding to the third sensing configuration. Examples of such sensing parameters may be, or may include, one of one or more sensing directions, one or more beam widths, a number of repetitions and a transmit power.

In various embodiments, the third sensing configuration may define a sensing scheme for supporting a resolution level. In various embodiments, the third sensing configuration may indicate and/or include one or more sensing parameters (e.g., a sensing parameter set). The sensing parameters may include any of a number of sensing cycles, a time duration, a periodicity of sensing cycles, one or more directions of sensing, a beam width of a directional transmission, a number of repetitions, a bandwidth, a bandwidth span, a number of PRBs, a number of REs, a density in a frequency domain, and a transmit power.

In various embodiments, the WTRU 102 may be triggered to perform sensing according to the third configuration based on an event. In various embodiments, that event may be any of a request from a higher layer application and a timing configuration. In various embodiments, the WTRU 102 may select the third or other sensing configurations responsive to being triggered to perform sensing. The WTRU may select the sensing configurations based on various sensing parameters (including, for example, resolution levels).

In various embodiments, the WTRU 102 may transmit, to the network element, ("seventh") information indicating an acknowledgement of the sixth information. In various embodiments, the seventh information may be transmitted as, or included in, any of a control message and a response message.

In various embodiments, the WTRU 102 may receive, from the network element, ("eighth") information indicating to change to a fourth sensing configuration of the plurality of sensing configurations. The fourth sensing configuration may include information indicating one or more fourth time and frequency resources of the wireless communications system. In various embodiments, the fourth sensing configuration may be any of the plurality of sensing configurations other than the current sensing configuration. In various embodiments, the eighth information may include a fourth identifier of the fourth sensing configuration. In various embodiments, the fourth identifier may be, for example, a sensing configuration ID of the fourth sensing configuration. The fourth identifier may be included to indicate activation of the fourth sensing configuration. In various embodiments, the eighth information may include and/or indicate a list of time offsets (e.g., an updated list of time offsets). The list of time offsets may include a time offset associated with the fourth sensing configuration (and possibly, one for each of one or more other of the plurality of sensing configurations). In various embodiments, the eighth information may indicate and/or include one or more transmit power levels and one or more covering codes (e.g., a transmit power level and a covering code for the fourth sensing configuration and for each of zero or more other sensing configurations of the plurality of sensing configurations). The eighth information might not include and/or indicate the list of time offsets, transmit power levels, covering codes and/or portions thereof if already provided (e.g., in the first, third and/or sixth information). In various embodiments, the eighth information may include an identifier of the current sensing configuration. The identifier of the current sensing configuration may be included to indicate deactivation of the current sensing configuration.

In various embodiments, the WTRU 102 may transmit a fourth sensing signal according to the fourth sensing configuration and using the one or more fourth time and frequency resources. The fourth sensing signal may be a reference signal. The WTRU 102 may transmit the fourth sensing signal in the same ways as previously described. The WTRU 102, for example, may wait an amount of time before starting to transmit the fourth sensing signal. The amount of time may correspond to, and/or be based on, the fourth time offset. The fourth time offset may be referenced to a time of the reception of the eighth information (e.g., transmission of signaling, messages, etc. carrying the eighth information).

In various embodiments, the WTRU may perform one or more fourth measurements related to the transmitted fourth sensing signal, e.g., in the same ways as previously described. In various embodiments, the WTRU 102 may perform the fourth measurements at least in part by measuring a fourth power and round-trip time of a backscatter associated with the fourth sensing signal. The WTRU 102 may carry out reporting of the forth sensing measurements (not shown) in the same ways as previously described.

In various embodiments, the eighth information may include and/or indicate values for sensing parameters corresponding to the fourth sensing configuration. Examples of such sensing parameters may be, or may include, one of one or more sensing directions, one or more beam widths, a number of repetitions and a transmit power.

In various embodiments, the fourth sensing configuration may define a sensing scheme for supporting a resolution level. In various embodiments, the fourth sensing configuration may indicate and/or include one or more sensing parameters (e.g., a sensing parameter set). The sensing parameters may include any of a number of sensing cycles, a time duration, a periodicity of sensing cycles, one or more directions of sensing, a beam width of a directional transmission, a number of repetitions, a bandwidth, a bandwidth span, a number of PRBs, a number of REs, a density in a frequency domain, and a transmit power.

In various embodiments, the WTRU 102 may be triggered to perform sensing according to the fourth configuration based on an event. In various embodiments, that event may be any of a request from a higher layer application and a timing configuration. In various embodiments, the WTRU 102 may select the fourth or other sensing configurations responsive to being triggered to perform sensing. The WTRU may select the sensing configurations based on various sensing parameters (including, for example, resolution levels).

In various embodiments, the WTRU 102 may transmit, to the network element, ninth information indicating an acknowledgement of the eighth information. In various embodiments, the ninth information may be transmitted as, or included in, any of a control message and a response message.

FIG. 12 is a flow chart illustrating an example flow 1200 for carrying out WTRU-initiated active sensing using resources of a wireless communications system according to various embodiments. The flow 1200 and accompanying disclosures herein may be considered a generalization of the disclosures accompanying the procedure 500 of FIG. 5. For convenience and simplicity of exposition, the flow 1200 is described with reference to the architecture of the communications system 100 (FIG. 1). The flow 1200 may be carried out using different architectures as well.

The flow 1200 and accompanying disclosures herein are similar to the flow 1100 of FIG. 11 and accompanying disclosures, except that, instead of informing the network of the autonomous selection and switch from the first sensing configuration to second sensing configuration, the network may initiate the switch. For example, referring to FIG. 12, the WTRU may receive, from the network element, ("second") information indicating to change from the first sensing configuration to the second sensing configuration (1208). The WTRU 102 may receive the second information in a request (e.g., activation/reconfiguration request). The activation/reconfiguration request may be received in and/or as any of a control message and a (re) configuration message. The activation/reconfiguration request may indicate and/or include any of the second sensing configuration, a (e.g., a requested) resolution level, etc. Further, instead of receiving an acknowledgement of the second information, the WTRU 102 may transmit, to the network element, ("third") information indicating an acknowledgement of the second information. In various embodiments, the third information may be transmitted as, or included in, any of a control message and a response message.

FIG. 13 is a flow chart illustrating an example flow 1300 for carrying out WTRU-initiated active sensing using resources of a wireless communications system according to various embodiments. The flow 1300 and accompanying disclosures herein may be considered a generalization of the disclosures accompanying any of (i) the procedure 400 of FIG. 4, and (ii) a combination the procedures 200 and 300 of FIGS. 2 and 3, respectively. For convenience and simplicity of exposition, the flow 1300 is described with reference to the architecture of the communications system 100 (FIG. 1). The flow 1300 may be carried out using different architectures as well.

The flow 1300 and accompanying disclosures herein are similar to the flow 900 of FIG. 9) and accompanying disclosures, except that, the first sensing configuration is initially activated. For example, the WTRU may be provisioned with (or indicated) the (at least) the first sensing configuration of the plurality of sensing configurations being initially active or activated. In which case, the WTRU 102 need not receive the first information as disclosed herein in connection with FIG. 9.

FIG. 14 is a flow chart illustrating an example flow 1400 for carrying out WTRU-initiated active sensing using resources of a wireless communications system according to various embodiments. The flow 1400 and accompanying disclosures herein may be considered a generalization of the disclosures accompanying the procedure 500 of FIG. 5. For convenience and simplicity of exposition, the flow 1400 is described with reference to the architecture of the communications system 100 (FIG. 1). The flow 1400 may be carried out using different architectures as well.

The flow 1400 and accompanying disclosures herein are similar to the flow 1000 of FIG. 10 and accompanying disclosures, except that, the first sensing configuration is initially activated. For example, the WTRU may be provisioned with (or indicated) the (at least) the first sensing configuration of the plurality of sensing configurations being initially active or activated. In which case, the WTRU 102 need not receive the first information as disclosed herein in connection with FIG. 10.

Figure 15:
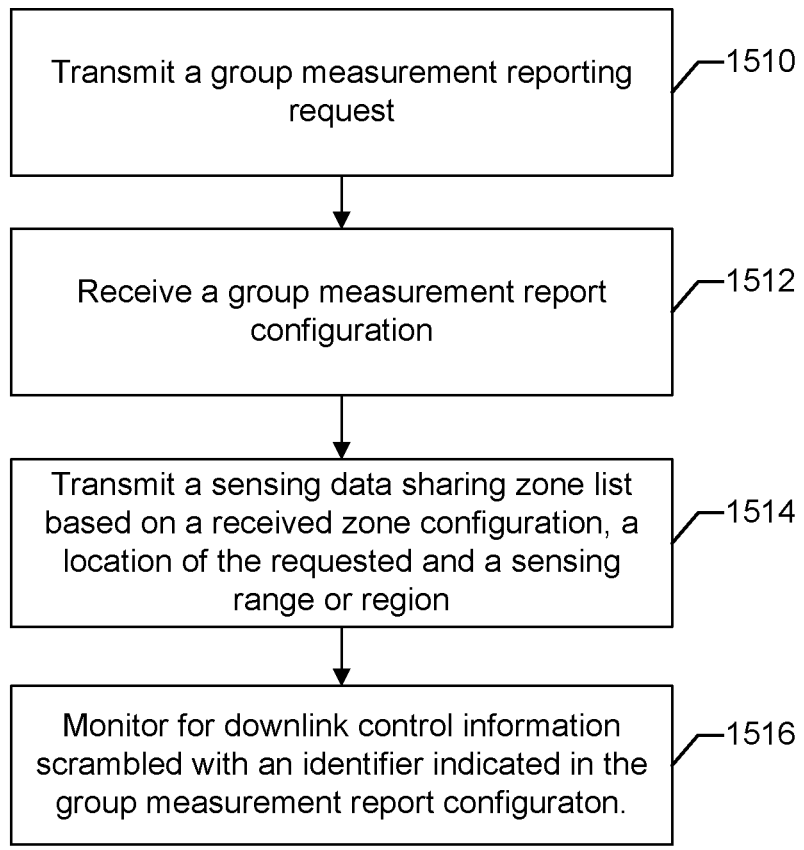
FIG. 15 is flow chart illustrating an example flow for carrying out zone-based measurement reporting.

FIG. 15 is flow chart illustrating an example flow 1500 for carrying out zone-based measurement reporting. The flow 1500 and accompanying disclosures herein may be considered a generalization of the disclosures accompanying any of the procedures 700 and 800 of FIGS. 7 and 8, respectively. For convenience and simplicity of exposition, the flow 1500 is described with reference to the architecture of the communications system 100 (FIG. 1). The flow 1500 may be carried out using different architectures as well.

Referring to FIG. 1500, a WTRU may transmit a group measurement reporting request (1510). The group measurement reporting request may include including information indicating any of a current location of the WTRU, a reporting periodicity, a range and a precision. The WTRU may receiving a group measurement report configuration (1512). The group measurement report configuration may include any of a start time, a periodicity, and an identifier indicated in the group measurement report configuration (e.g., a G-RNTI).

The WTRU may transmit a sensing data sharing zone list based on a received zone configuration, the location of the WTRU and a sensing range or region (1514). The WTRU may monitor for a DCI scrambled with the identifier indicated in the group measurement report configuration (1516). For example, the WTRU may monitor one or more PDCCH transmissions for a DCI scrambled using a G-RNTI. In various embodiments, the WTRU may send an updated sensor sharing zone list on condition that the sharing zone list is different from a previous sensor sharing zone. In various embodiments, the WTRU may obtain various group measurement reports (e.g., in one or more PDSCH transmission).

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices. i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station. RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A. B, and C, etc." is used, in general such a construction is intended in the sense one having skill in the art would understand the convention (e.g., "a system having at least one of A. B, and C" would include but not be limited to systems that have A alone. B alone. C alone. A and B together. A and C together. B and C together, and/or A. B, and C together, etc.). In those instances where a convention analogous to "at least one of A. B. or C, etc." is used, in general such a construction is intended in the sense one having skill in the art would understand the convention (e.g., "a system having at least one of A. B. or C" would include but not be limited to systems that have A alone. B alone. C alone. A and B together. A and C together. B and C together, and/or A. B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 25 U.S.C. § 112, ¶ 6 or means-plus-function claim format, and any claim without the terms "means for" is not so intended.

What is claimed is:

1. A method implemented in a wireless transmit/receive unit, WTRU, the method comprising:
   receiving first information from a network element of a wireless communications system, wherein:
      the first information indicates an activation of at least a first sensing configuration of a plurality of sensing configurations;
      the first sensing configuration comprises second information indicating a first resolution level; and
      the plurality of sensing configurations comprises at least a second sensing configuration comprising third information indicating a second resolution level, wherein the second resolution level is different from the first resolution level;
   transmitting a first sensing signal according to the first sensing configuration;
   performing one or more first measurements related to the first sensing signal; and
   transmitting fourth information, to the network element based at least in part on the one or more measurements and the first resolution level, wherein the fourth information indicates a change from the first sensing configuration to the second sensing configuration.

2. The method of claim 1, comprising:
   receiving fifth information from the network element, wherein the fifth information indicates an acknowledgment of the change.

3. The method of claim 1, wherein:
   transmitting fourth information comprises transmitting the fourth information to the network element based at least in part on the one or more measurements satisfying a threshold associated with the first resolution level.

4. The method of claim 1, comprising:
   prior to transmitting the first sensing signal,
      detecting an event, wherein the event is any of a request from a higher layer application and a timing configuration; and
      triggering a sensing occasion based on the event.

5. The method of claim 1, comprising:
   triggering transmission of the fourth information based on an event, wherein the event comprises the WTRU determining to switch to a sensing configuration other than the first sensing configuration.

6. A wireless transmit/receive unit, WTRU, comprising circuitry, including a transmitter, a receiver, a processor and memory, configured to:
   receive first information from a network element of a wireless communications system, wherein:
      the first information indicates an activation of at least a first sensing configuration of a plurality of sensing configurations;
      the first sensing configuration comprises second information indicating a first resolution level; and
      the plurality of sensing configurations comprises at least a second sensing configuration comprising third information indicating a second resolution level, wherein the second resolution level is different from the first resolution level;
   transmit a first sensing signal according to the first sensing configuration;
   perform one or more measurements related to the first sensing signal;
   transmit fourth information to the network element based at least in part on the one or more measurements and the first resolution level, wherein the fourth information indicates a request for change in resolution level; and
   receive, from the network element, fifth information indicating the second sensing configuration.

7. The WTRU of claim 6, wherein the circuitry is configured to:
   transmit, to the network element, sixth information indicating an acknowledgment of the fifth information.

8. The WTRU of claim 6, wherein the circuitry being configured to transmit fourth information comprises the circuitry being configured to:
   transmit the fourth information to the network element based at least in part on the one or more measurements satisfying a threshold associated with the first resolution level.

9. The WTRU of claim 6, wherein the circuitry is configured to:
   prior to transmitting the first sensing signal,
      detect an event, wherein the event is any of a request from a higher layer application and a timing configuration; and
      trigger a sensing occasion based on the event.

10. The WTRU of claim 6, wherein the circuitry is configured to:
    trigger transmission of the fourth information based on an event, wherein the event comprises the WTRU determining to switch to a sensing configuration other than the first sensing configuration.

11. The method of claim 1, wherein at least one of:
    the fourth information comprises a second identifier of the second sensing configuration; and
    transmitting the fourth information comprises transmitting the second identifier via any of a control message and a configuration message.

12. The method of claim 11, wherein the control message comprises a medium access control (MAC) control element (CE).

13. The method of claim 1, comprising:
transmitting a second sensing signal according to the second sensing configuration; and
performing one or more second measurements related to the second sensing signal.

14. The method of claim 1, wherein:
the first sensing configuration comprises ninth information indicating one or more first time and frequency resources; and
transmitting the first sensing signal comprises transmitting the first sensing signal according to the first sensing configuration and using one or more of the one or more first time and frequency resources.

15. The method of claim 13, wherein:
the second sensing configuration comprises tenth information indicating one or more second time and frequency resources; and
transmitting the second sensing signal comprises transmitting the second sensing signal according to the second sensing configuration and using the one or more second time and frequency resources.

16. The WTRU of claim 6, wherein at least one of:
the fourth information comprises a second identifier of the second sensing configuration; and
the circuitry being configured to transmit the fourth information comprises the circuitry being configured to transmit the second identifier via any of a control message and a configuration message.

17. The WTRU of claim 16, wherein the control message comprises a medium access control (MAC) control element (CE).

18. The WTRU of claim 6, wherein the circuitry is configured to:
transmit a second sensing signal according to the second sensing configuration; and
perform one or more second measurements related to the second sensing signal.

19. The WTRU of claim 6, wherein:
the first sensing configuration comprises ninth information indicating one or more first time and frequency resources; and
the circuitry being configured to transmit the first sensing signal comprises the circuitry being configured to transmit the first sensing signal according to the first sensing configuration and using the one or more first time and frequency resources.

20. The WTRU claim 18, wherein:
the second sensing configuration comprises tenth information indicating one or more second time and frequency resources; and
the circuitry being configured to transmit the second sensing signal comprises the circuitry being configured to the second sensing signal according to the second sensing configuration and using the one or more second time and frequency resources.

* * * * *